(12) United States Patent
Ohba et al.

(10) Patent No.: US 9,870,117 B2
(45) Date of Patent: Jan. 16, 2018

(54) PROCESSING APPARATUS AND METHOD FOR CONTROLLING THE SAME

(71) Applicant: Konica Minolta, Inc., Tokyo (JP)

(72) Inventors: Shin Ohba, Kokubunji (JP); Takatsugu Kuno, Toyokawa (JP); Ken Miyazaki, Sagamihara (JP); Hiroshi Shimura, Hachioji (JP); Shigeo Konuma, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 494 days.

(21) Appl. No.: 14/485,924

(22) Filed: Sep. 15, 2014

(65) Prior Publication Data

US 2015/0082254 A1   Mar. 19, 2015

(30) Foreign Application Priority Data

Sep. 17, 2013  (JP) .................................. 2013-191920

(51) Int. Cl.
G06F 3/14       (2006.01)
G06F 3/0481    (2013.01)
G06F 9/44       (2006.01)

(52) U.S. Cl.
CPC .......... *G06F 3/0481* (2013.01); *G06F 9/4446* (2013.01)

(58) Field of Classification Search
CPC ............. G06F 3/14; G06F 3/17; G06F 3/0481
(Continued)

(56) References Cited

U.S. PATENT DOCUMENTS

2007/0273658 A1* 11/2007 Yli-Nokari ......... G06F 3/03547
                                                                345/173
2009/0249257 A1* 10/2009 Bove .................. G06F 3/04812
                                                                715/858
(Continued)

FOREIGN PATENT DOCUMENTS

JP       1993-011970       1/1993
JP       1995-219499       8/1995
(Continued)

OTHER PUBLICATIONS

Japanese Office Action dated Sep. 24: Patent Application No. 2013-191020; Patent Attorney: Tohiji Una; Applicable provisions: Patent Law Article 29 paragraph 2, Article 36; 4 pages and English translation, 4 pages; total of 8 pages, 2015.

*Primary Examiner* — Ruay Ho
(74) *Attorney, Agent, or Firm* — Lucas & Mercanti, LLP

(57) ABSTRACT

Disclosed is a processing apparatus, which makes it possible to make a cursor automatically move by employing a pointing device. The processing apparatus includes a control section and a processing section that implements processing under the controlling operations conducted by the control section. The control section is provided with: a display controlling function that controls the displaying operations on the screen; a processing implementation controlling function that implements the processing corresponding to the object designated by the cursor; a status change detecting function that detects a status change against which it is necessary to implement a processing operation; and an automatic cursor moving function that conducts the controlling operations so as to automatically move the cursor to the object corresponding to the processing operation being necessary for the status change concerned, or a processing implementation position display, at which the necessary
(Continued)

processing operation should be implemented against the status change.

19 Claims, 11 Drawing Sheets

(58) Field of Classification Search
USPC ............... 715/767, 856, 858; 345/157, 173; 348/14.09; 1/1
See application file for complete search history.

(56) References Cited

U.S. PATENT DOCUMENTS

| | | | | |
|---|---|---|---|---|
| 2009/0300004 | A1* | 12/2009 | Tokashiki | G06F 17/30864 |
| 2012/0182384 | A1* | 7/2012 | Anderson | H04L 12/1827 |
| | | | | 348/14.09 |
| 2012/0262371 | A1* | 10/2012 | Lee | H04N 21/485 |
| | | | | 345/157 |
| 2014/0365931 | A1* | 12/2014 | Yoshimura | G06F 3/04842 |
| | | | | 715/767 |

FOREIGN PATENT DOCUMENTS

| | | |
|---|---|---|
| JP | 08-152972 | 6/1996 |
| JP | 09-244863 | 9/1997 |
| JP | 09-305220 | 11/1997 |
| JP | 2001-113792 | 4/2001 |
| JP | 2003-225474 | 8/2003 |
| JP | 2007-058735 | 3/2007 |

\* cited by examiner

PROCESSING APPARATUS AND METHOD FOR CONTROLLING THE SAME

This application is based on Japanese Patent Application NO. 2013-191920 filed on Sep. 17, 2013, with the Japan Patent Office, the entire content of which is hereby incorporated by reference.

Under 35 U.S.C. §119, we claim priority of this application based on Japanese Patent Application NO. 2013-191920 filed on Sep. 17, 2013 with the Japan Patent Office.

BACKGROUND OF THE INVENTION

Field of the Invention

The present invention relates to a technology that is to be applied to various kinds of processing apparatuses, each of which implements a processing by using a pointing device so as to make a cursor, currently displayed on a screen, move thereon.

Description of Related Art

Generally speaking, a GUI (Graphical User Interface) that makes a cursor, currently displayed on a screen, move thereon, according to user's operations for moving a pointing device, has been widely employed in various kinds of processing apparatuses. In this connection, any one of a mouse, a trackball, a touch pad, etc. may be employed as the pointing device concerned. The user may use the cursor to designate any one of objects, including a button, an icon, a tub, etc., currently displayed on the screen. Then, the processing apparatus implements a processing allotted to the object above-designated.

Further, this kind of GUI is also introduced into an image forming apparatus that implements a production printing. In this connection, with respect to the operations, including display operations, performed on the above-mentioned GUI by using the mouse, various kinds of the proposals are set forth in the Patent Documents as cited in the following.

Still further, the operation for automatically moving the cursor to be employed in the GUI, the other operation for displaying a pop-up window in the vicinity of the object designated by the cursor, etc. are set forth in the Patent Documents cited in the following as well.

For instance, when the user uses a mouse to conduct screen operations, Japanese Patent Application Laid-Open Publication NO. 09-244863 sets forth a method for jumping a cursor to a button having the highest probability (for instance, [OK]-button), by regarding the user's mouse operation as the trigger at the time of changing the window.

Further, Japanese Patent Application Laid-Open Publication NO. 08-152972 sets forth another method for automatically jumping a cursor to a position of the predetermined value button of the dialog to be outputted (for instance, [OK]-button), by regarding the user's mouse operation as the trigger, irrespective of the position of the mouse cursor currently displayed.

In this connection, in the GUI as above-mentioned, sometimes, the apparatus concerned may request the user to input an instruction and/or an allowance, due to a certain status change of the apparatus concerned. In such the case as above-mentioned, a message displaying section may display a message, indicating "Please do xxx" or the like, onto the display screen.

However, in an apparatus recently put in the market, operation items and setting items to be displayed on a display screen have increased more and more, and accordingly, a large number of items are displayed within the single display screen. Owing to such the situation, sometimes, the user could not recognize the above-mentioned message of "Please do xxx" or the like, currently displayed by the apparatus side.

Further, since the apparatus has become complicated, sometimes, the user could not understand that the message of "Please do xxx", caused by the status change of the apparatus concerned, concretely means what the user should do.

As well as the above, in order to notify the user of the current status of the apparatus, caused by the status change of the apparatus concerned, sometimes, the message of "The operation of ---- has been completed" is displayed on the display screen by the apparatus side. Even in this case, provided that the user is a layman in operations of the apparatus concerned, sometimes, the user could not recognize the above-mentioned message displayed by the apparatus side, or the user could not understand what he should do corresponding to the message notified by the apparatus side.

SUMMARY OF THE INVENTION

To overcome the abovementioned drawbacks in conventional processing apparatuses, it is one of objects of the present invention to provide a processing apparatus and a method for controlling the same, which makes it possible to make a cursor, currently displayed on an operating screen serving as a GUI (Graphical User Interface), move therein by employing a pointing device so as to appropriately perform operations for implementing various kinds of processing.

Accordingly, at least one of the objects of the present invention can be attained by any one of the processing apparatuses described as follows.

(1) According to a processing apparatus reflecting an aspect of the present invention, the processing apparatus comprises: a control section that conducts controlling operations for displaying an image on a screen and for controlling each of sections; and a processing section that implements various kinds of processing, under the controlling operations conducted by the control section; wherein the control section is provided with: a display controlling function that controls displaying operations to be implemented on the screen, so as to display an object, which corresponds to contents of a processing, on the screen, and so as to display a cursor, which corresponds to an operation of a pointing device; a processing implementation controlling function that implements the processing, which corresponds to the object designated by the cursor; a status change detecting function that detects a status change against which it is necessary for the processing apparatus to implement a processing; and an automatic cursor moving function that, when the status change detecting function detects the status change, conducts the controlling operations so as to automatically move the cursor onto the object, which corresponds to the processing necessary for coping with the status change concerned, or onto a processing implementation position display that indicates such a position at which the processing necessary for coping with the status change concerned should be implemented, on the screen.

(2) According to another aspect of the present invention, in the processing apparatus recited in item 1, the status change detecting function detects such the status change that is caused by an error to which an restoration processing is necessary to apply, and when the status change detecting function detects the error as the status change, the automatic cursor moving function conducts the controlling operations, so as to automatically move the cursor to the object corresponding to the restoration processing, or the processing implementation position display, at which the necessary processing operation should be implemented against the error.

(3) According to still another aspect of the present invention, in the processing apparatus recited in item 1, the status change detecting function detects a fact that a job, which is to be implemented by the processing implementation controlling function, is received, as the status change, and in the screen for designating the processing to be implemented by the processing implementation controlling function, the automatic cursor moving function conducts the controlling operations, so as to automatically move the cursor onto the object corresponding to a commencement of the job detected by the status change detecting function as the status change.

(4) According to still another aspect of the present invention, in the processing apparatus recited in item 2, the automatic cursor moving function conducts the controlling operations so as to automatically move the cursor onto the object corresponding to a guidance display of error cancelling procedures, serving as the object corresponding to the restoration processing.

(5) According to still another aspect of the present invention, in the processing apparatus recited in item 2, the automatic cursor moving function conducts the controlling operations so as to automatically move the cursor onto the object corresponding to a resumption of the processing after the error has been cancelled, serving as the object corresponding to the restoration processing.

(6) According to still another aspect of the present invention, in the processing apparatus recited in item 2, the automatic cursor moving function conducts the controlling operations so as to automatically move the cursor onto the object corresponding to a material existence detecting adjustment to be implemented after an operation for supplying materials has been completed, serving as the object corresponding to the restoration processing.

(7) According to still another aspect of the present invention, in the processing apparatus recited in item 2, the automatic cursor moving function conducts the controlling operations so as to automatically move the cursor onto a specific position on the screen, which corresponds to an error occurring position within an image forming apparatus, as the processing implementation position display at which the necessary processing operation should be implemented against the error.

(8) According to still another aspect of the present invention, in the processing apparatus recited in any one of items 1-7, the control section is further provided with: a user management function that manages a usable range of the processing apparatus allotted to a user, based on an authority established for every user; wherein, under management operations conducted by the user management function, in a case where the processing operation, being necessary for the status change concerned, falls into the usable range based on the authority established for the user, the automatic cursor moving function conducts the controlling operations so as to make the cursor move, while, in a case where the processing operation, being necessary for the status change concerned, is out of the usable range based on the authority established for the user, the automatic cursor moving function disables the controlling operations for making the cursor move.

(9) According to still another aspect of the present invention, in the processing apparatus recited in any one of items 1-8, during a time when the user is operating the pointing device or is performing another operation, the automatic cursor moving function disables the controlling operations for making the cursor move.

(10) According to still another aspect of the present invention, in the processing apparatus recited in any one of items 1-9, after the display controlling function has completed the controlling operations for displaying the object corresponding to the processing operation being necessary for the status change concerned, or the processing implementation position display, at which the necessary processing operation should be implemented against the status change concerned, the automatic cursor moving function conducts the controlling operations so as to make the cursor move in response to the status change.

(11) According to still another aspect of the present invention, in the processing apparatus recited in any one of items 1-10, the automatic cursor moving function conducts the controlling operations so as to display a cursor moving path, on which the cursor has been made to move, during a predetermined time interval as a moving locus thereof.

(12) According to still another aspect of the present invention, in the processing apparatus recited in any one of items 1-11, the automatic cursor moving function conducts the controlling operations so as to make the cursor move onto such a position, residing in the vicinity of a moving destination point, that does not conceal any information in regard to the moving destination point concerned.

(13) According to still another aspect of the present invention, in the processing apparatus recited in any one of items 1-12, the automatic cursor moving function conducts the controlling operations so as to make the cursor move in such a manner that the cursor does not overlap with an object, other than the object serving as a moving destination object, or a processing implementation position display, other than the processing implementation position display serving as a moving destination position, in midcourse of a moving operation thereof.

(14) According to still another aspect of the present invention, in the processing apparatus recited in any one of items 1-13, the automatic cursor moving function conducts the controlling operations so as to make the cursor flash between ON and OFF states at a cursor moving destination position.

(14) According to yet another aspect of the present invention, in the processing apparatus recited in any one of items 1-14, under the controlling operations conducted by the control section, the processing section implements the various kinds of processing in regard to an image processing and/or an image forming operations.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
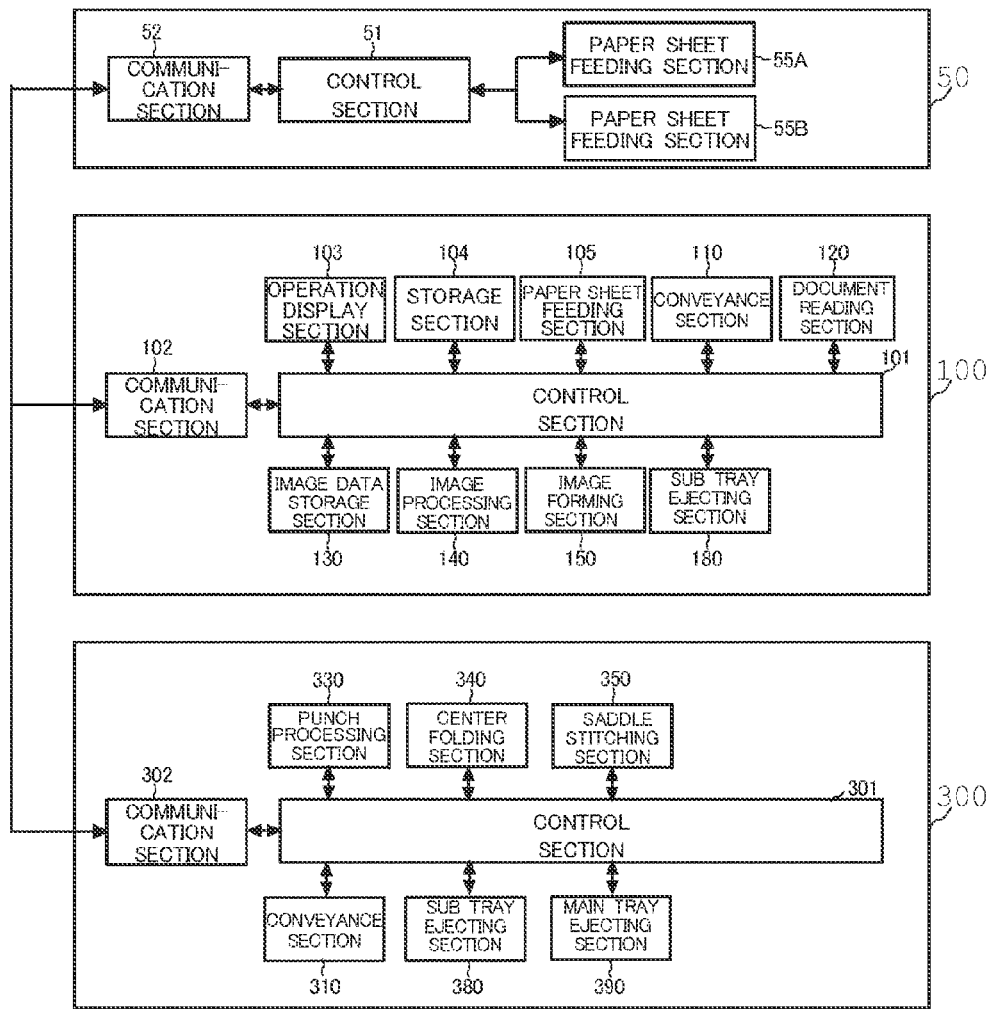
FIG. 1 is a block diagram indicating a configuration of an image forming system in accordance with an embodiment of the present invention.

Referring to the drawings, the preferred embodiment in accordance with the present invention will be detailed in the following. In this connection, the processing apparatus in accordance with the present invention is applicable for such an apparatus that implements at least one of various kinds of processing, such as a manufacturing apparatus, a processing equipment, various kinds of decomposing (separating) apparatuses that decompose a substance or a material, a conveyance apparatus, an incineration equipment, an electric power generator, etc. The preferred embodiment in accordance with the present invention, cited hereinafter, will be detailed in the following by exemplifying any one of an image processing apparatus, an image forming apparatus and an image forming system as an example of the processing apparatuses or systems.

Further, the method for controlling the processing apparatus in accordance with the present invention is applicable for the method for controlling an apparatus that implements at least one of various kinds of processing, such as a manufacturing apparatus, a processing equipment, various kinds of decomposing (separating) apparatuses that decompose a substance or a material, a conveyance apparatus, an incineration equipment, an electric power generator, etc. The preferred embodiment in accordance with the present invention, cited hereinafter, will be detailed in the following by exemplifying the method for controlling any one of an image processing apparatus, an image forming apparatus and an image forming system as an example of the method for controlling the processing apparatuses or systems.

<Configuration of the System>

In the image forming system shown in FIG. 1 and FIG. 2, a paper sheet feeding apparatus 50 that feeds a paper sheet, an image forming apparatus 100 that forms an image onto a paper sheet and a paper-sheet processing apparatus 300 that applies various kinds of paper sheet processing to a paper sheet onto which an image is already formed (hereinafter, also referred to as an image-formed paper sheet, for simplicity) are cascaded in order of the paper sheet processing from an upstream side. In other words, the paper sheet feeding apparatus 50 that feeds a paper sheet, the image forming apparatus 100 that forms an image onto a paper sheet and the paper-sheet processing apparatus 300 that applies various kinds of paper sheet processing (including a punch processing, a center fold processing, a saddle stitch (staple) processing and so on) to the paper sheet onto which an image is already formed by the image forming apparatus 100 are serially arranged along the flow of the paper sheet processing, so as to constitute the image forming system for production printing use.

Figure 2:
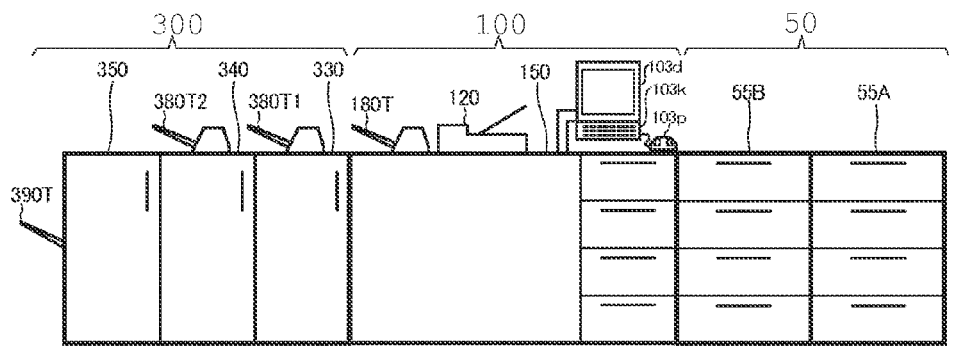
FIG. 2 is a front view showing an arrangement of various kinds of apparatuses included in an image forming system in accordance with an embodiment of the present invention.

Incidentally, it is also applicable that an external PC (Personal Computer), which is capable of communicating with the image forming system and issues various kinds of commands and/or instructions, resides at a position in the vicinity of or being apart from the image forming apparatus 100, though the external PC is not shown in FIG. 1 and FIG. 2. Referring to the schematic diagrams shown in FIG. 1 and FIG. 2, the configuration of each of the various kinds of apparatuses included in the image forming system will be detailed in the following.

The paper sheet feeding apparatus 50 is constituted by a control section 51, a communication section 52, a paper sheet feeding section 55A and a paper sheet feeding section 55B. In this connection, each of the paper sheet feeding section 55A and the paper sheet feeding section 55B, both shown in FIG. 2, is formed by serially connecting 3 stage paper sheet feeding units with each other. The control section 51 controls each of the sections provided in the paper sheet feeding apparatus 50. The communication section 52 communicates with the other apparatuses coupled to the paper sheet feeding apparatus 50. The paper sheet feeding section 55A feeds a paper sheet therefrom. The paper sheet feeding section 55B feeds a paper sheet therefrom, as well.

The image forming apparatus 100 is constituted by a control section 101, a communication section 102, an operation display section 103, a storage section 104, a paper sheet feeding section 105, a conveyance section 110, a document reading section 120, an image data storage section 130, an image processing section 140, an image forming section 150 and a sub tray ejecting section 180. In the structural configuration above-mentioned, the control section 101 controls each of the sections provided in the image forming apparatus 100, and at the same time, controls overall operations of the system serving as the image forming system. The communication section 102 implements operations for communicating with other apparatuses coupled thereto. The operation display section 103 accepts inputting operations performed by the user, and at the same time, displays the current status of the image forming apparatus 100. The storage section 104 stores various kinds of data. The paper sheet feeding section 105 feeds the paper sheets, accommodated therein, in accordance with process timing of the image forming operation. The conveyance section 110 conveys the paper sheet in accordance with process timing of the image forming operation. The document reading section 120 scans the document so as to generate image data thereof. The image data storage section 130 stores the image data, which is to be employed for the image forming operation, and various kinds of data. The image processing section 140 applies various kinds of image processing, necessary for forming the image, to the image data generated by the document reading section 120. The image forming section 150 implements an image forming operation based on the image forming command and the processed image data created by applying the image processing to the image data. The sub tray ejecting section 180 ejects the image-formed paper sheet onto a sub tray 180T serving as an ejecting section.

The paper-sheet processing apparatus 300 is constituted by a control section 301, a communication section 302, a conveyance section 310, a punch processing section 330, a center folding section 340, a saddle stitching section 350, a sub tray ejecting section 380 and a main tray ejecting section 390. In the configuration above-mentioned, the control section 301 controls each of the sections provided in the paper-sheet processing apparatus 300. The communication section 302 communicates with the other apparatus 100 coupled to the paper-sheet processing apparatus 300. The conveyance section 310 conveys a paper sheet in accordance with process timing of the paper sheet. The punch processing section 330 forms a punched hole onto the paper sheet. The center folding section 340 folds the paper sheet along the center line thereof. The saddle stitching section 350 applies a staple processing to the center folded paper sheets. The sub tray ejecting section 380 ejects the image-formed paper sheet onto a sub tray 380T1 or a sub tray 380T2, serving as an ejecting section. The main tray ejecting section 390 ejects the image-formed paper sheet onto a main tray 390T, serving as an ejecting section.

In this connection, the operating display section 103, shown in FIG. 2, is constituted by a key inputting device 103k, a display section 103d and a pointing device 103p. The key inputting device 103k, such as a keyboard provided with a plurality of keys, etc., accepts a key inputting operation performed by the user. The display section 103d displays various kinds of display screens indicating a current status of the image forming apparatus 100. The pointing device 103p is employed by the user for moving a cursor in the display screen displayed on the display section 103d. In addition, it is also possible for the operating display section 103 to communicate with the image forming apparatus 100 from a remote position through a wired or wireless network or through a wireless communication with the image forming apparatus 100, though it is not shown in the drawings.

Further, the control section 101 above-mentioned makes the cursor, displayed on the screen of the operating display section 103, to designate an object displayed on the screen, and then, implements the processing allotted to the object above-designated, so as to achieve the controlling operation serving as the GUI (Graphical User Interface). In this connection, hereinafter, an object is defined as an image or a symbol, such as a button, an icon, a tub, etc., displayed on the screen of the operating display section 103. When an object is designated by using the cursor, the control section 101 implement the processing allotted to the object concerned.

In relation with the GUI, the control section 101 is provided with a display controlling function, a processing implementation controlling function, a status change detecting function, an automatic cursor moving function and a user management function. The display controlling function is defined as such a function for displaying an object corresponding to contents of processing on the screen, and at the same time, controlling a display mode of the screen so as to display the cursor in accordance with the user's operation on the pointing device. The processing implementation controlling function is defined as such a function for implementing a processing operation corresponding to a designated object when the user designated any one of the objects by using the cursor. The status change detecting function is defined as such a function for detecting a status change to which it should be necessary to apply a certain processing, in the image forming apparatus 100 or the image forming system. The automatic cursor moving function is defined as such a control function for making the cursor automatically move onto an object, which corresponds to a processing necessary for coping with the status change concerned, or onto a processing implementation position display that indicates such a position at which a processing necessary for coping with the status change concerned should be implemented, on the screen. The user management function is defined as such a function for managing a usable range of the image forming system based on an authority for every user.

<Overall Operations>

Referring to the flowchart shown in FIG. 3 and the sequence diagram shown in FIG. 4, the operations of the image forming system, serving as a concrete example of the processing apparatus in accordance with the embodiment of the present invention will be detailed in the following. Further, the flow of the following operations to be conducted in the image forming system can be regarded as the method for controlling the processing apparatus.

Figure 3:
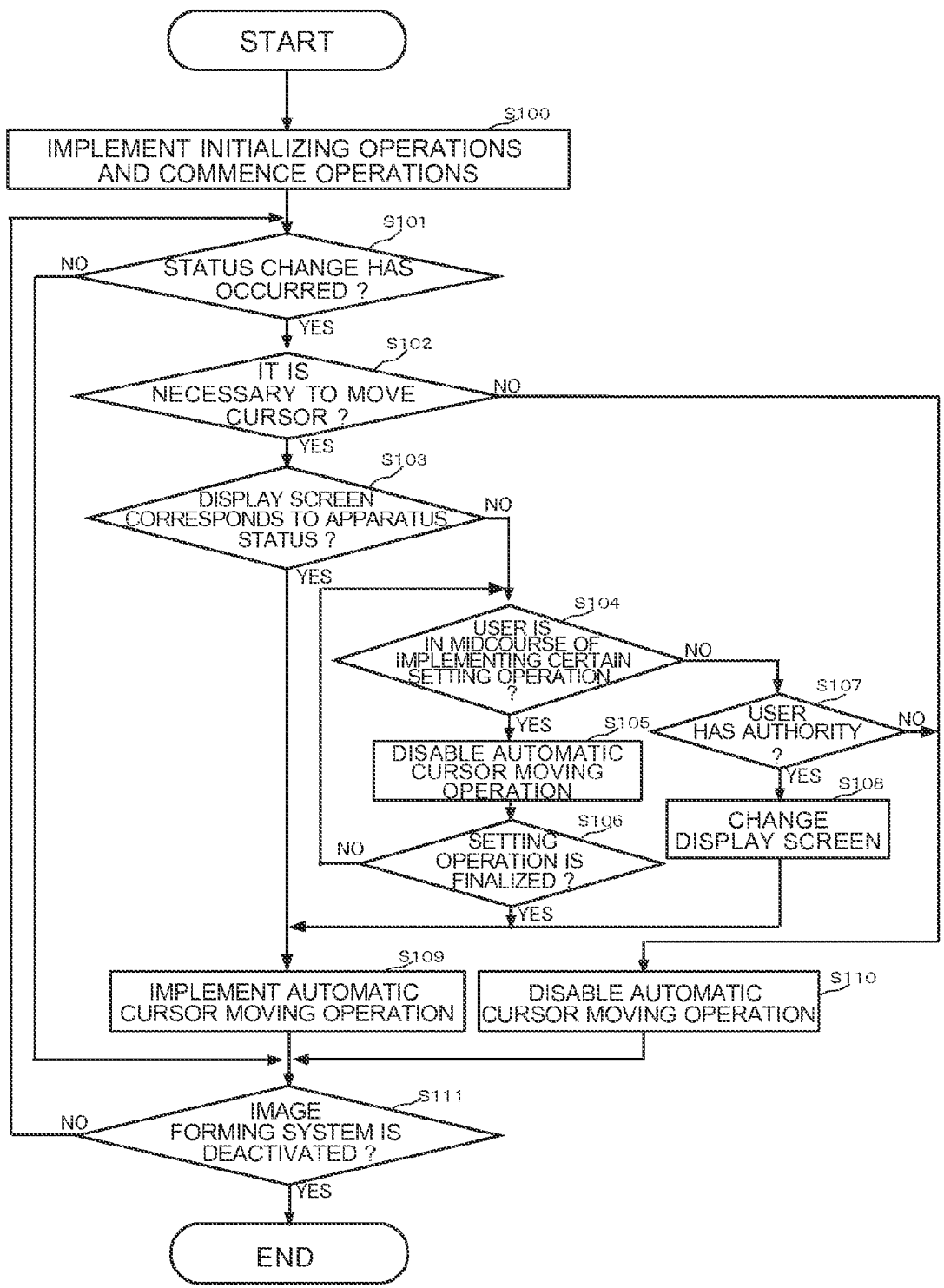
FIG. 3 is a flowchart indicating a flow of operations to be implemented in an image forming system in accordance with an embodiment of the present invention.

Accepting the user's operation for turning ON the power source, the control section 101 controls the concerned sections, provided in the image forming system, so as to implement the initializing operations (Step S100, shown in FIG. 3). Then, after the initializing operations have been completed, the control section 101 conducts the display controlling function to control the displaying status on the display screen so as to display the object (such as a button, an icon, a tub, etc.) corresponding to the contents of the processing onto the display screen of the operating display section 103 (Blocks 1c and 2c, shown in FIG. 4). Further, the control section 101 controls the displaying status on the display screen so as to display the cursor, corresponding to the user's operation on the pointing device 103p (Blocks 1a and 2a, shown in FIG. 4), on the display screen of the operating display section 103 (Blocks 1c and 2c, shown in FIG. 4).

Figure 4:
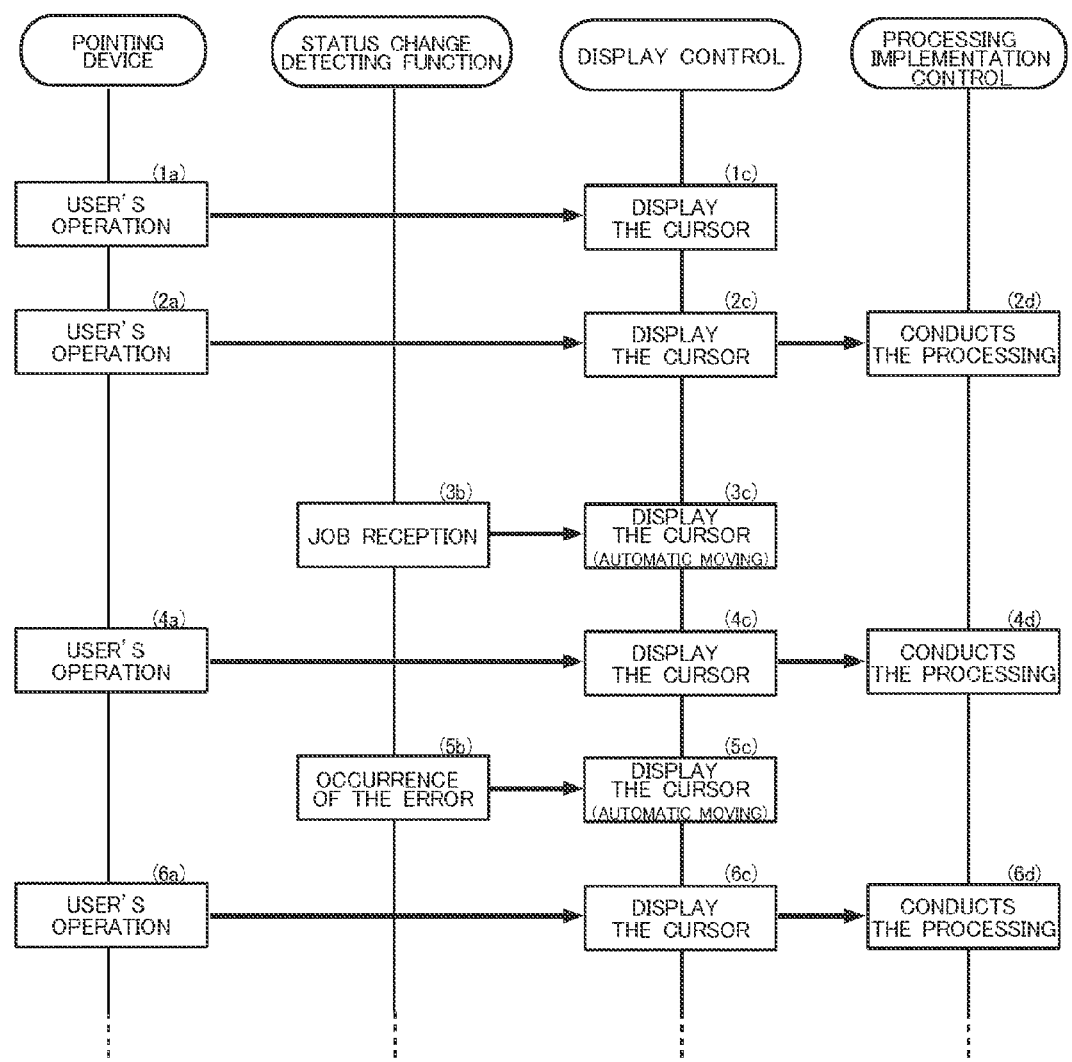
FIG. 4 is a sequence diagram indicating an operational sequence flow of operations to be implemented in an image forming system in accordance with an embodiment of the present invention.

When the user's operation on the pointing device 103p includes only an operation for moving the cursor without implementing any designating operation, such as a clicking action on the object or the like, the control section 101 conducts the display controlling function so as to make the depicted cursor move (Blocks 1a and 1c, shown in FIG. 4). On that occasion, the control section 101 does not implements the processing, due to the lack of designating operation, such as clicking action on the object or the like (Blocks 1a and 1c, shown in FIG. 4).

On the other hand, when the user's operation on the pointing device 103p includes both the operation for moving the cursor and the designating operation, such as a clicking action on the object or the like, the control section 101 conducts the display controlling function so as to make the depicted cursor move, and at the same time, conducts the processing implementation controlling function so as to implement the processing operation corresponding to the object designated by the cursor on the display screen (Blocks 2a, 2c and 2d, shown in FIG. 4).

In this connection, the expression of "the object is designated by the cursor" means that the user performs the designating operation, such as a clicking action on the object or the like, onto the cursor residing at the concerned object, by using the pointing device 103p. In this connection, with respect to the clicking action to be performed on that occasion, it is desirable that a number of clicking or the like is determined in advance, in order to discriminate the case where the object is to be designated, from cases other than the above case.

Successively, the control section 101, provided with the status change detecting function, monitors an occurrence of a certain status change in each of the sections included in the image forming system (Step S101, shown in FIG. 3). In this connection, when detecting no status change (Step S101; NO, shown in FIG. 3), the control section 101 repeats the operation for detecting a status change (Step S111; NO, Step S101, shown in FIG. 3) until all of the operations of the image forming system are deactivated (Step S111, shown in FIG. 3). In this connection, the term of "status change" is defined as such a change that is generated in the image forming system and requires a certain processing to be applied to the generated change, and is detectable by the status change detecting function.

Concretely speaking, in a case where only the time is changed by the clock signals generated in the control section 101, the display of the time is made to merely change, without applying any specific processing. Accordingly, this case does not fall under a category of the "status change". On the other hand, in a case where there exists an implementation scheduled job established by the timer setting, it is necessary to commence the processing of the implementation scheduled job at the time when the setting time has arrived. Accordingly, this case falls under the category of the "status change".

Further, in a case where a job data has received from the external environment, it is necessary to determine a processing direction in regard to how to process the received job concerned. Accordingly, this case falls under the category of the "status change". Further, in a case where the apparatus is deactivated due to an occurrence of a certain error, such as a jam occurrence, etc., it is necessary to apply a certain counter-error processing to the apparatus concerned. Accordingly, this case falls under the category of the "status change". Still further, in a case where the cause of the error is eliminated after the apparatus has been deactivated due to the occurrence of the error, such as a jam occurrence, etc., it is necessary to apply a reboot processing for resuming the image forming operation to the image forming system. Accordingly, this case falls under the category of the "status change".

Still successively, when detecting a certain status change (Step S101; YES, shown in FIG. 3), the control section 101, provided with the status change detecting function, determines whether or not it is necessary to move the cursor, currently displayed within the display screen of the operating display section 103, in accordance with the status change above-detected (Step S102, shown in FIG. 3). In this connection, hereinafter, the above-expression of "it is necessary to move the cursor, currently displayed within the display screen" is defined as such a case that the automatic cursor moving function provided in the control section 101 determines that, when the status change detecting function detects a status change, it is necessary to support the user by moving the cursor onto an object (such as a button, an icon, a tub, etc., currently displayed on the display screen), which corresponds to a processing necessary for coping with the status change concerned, or onto a processing implementation position display (a position display residing within a graphical image of the apparatus displayed on the displayed screen, etc.) that indicates such a position at which a processing necessary for coping with the status change concerned should be implemented, on the screen.

Still successively, in a case where the status change is detected (Step S101; YES, shown in FIG. 3) and control section 101 determines that it is unnecessary to move the cursor (Step S102; NO, shown in FIG. 3), the control section 101 does not implement the automatic cursor moving operation on the operating display section 103 (Step S110, shown in FIG. 3). Then, the control section 101 repeats the status change detecting operation (Step S101, shown in FIG. 3) and the processing Steps followed to Step S101, until all of the operations of the image forming system are deactivated (Step S111, shown in FIG. 3).

On the other hand, in a case where the status change is detected (Step S101; YES, shown in FIG. 3) and control section 101 determines that it is necessary to move the cursor (Step S102; YES, shown in FIG. 3), the control section 101 determines whether or not the display screen, currently displayed on the operating display section 103, is the "display screen corresponding to the apparatus status" (Step S103, shown in FIG. 3). In this connection, hereinafter, the above-expression of the "display screen corresponding to the apparatus status" is defined as such a display screen that indicates an overall status of the apparatus concerned. Incidentally, in a case of image forming system, a display screen, which indicates an overall status of an apparatus, displays such items, including a processing status of the job data, a receiving status of the job data, a status (such as a size of paper sheet, a kind of paper sheet, a residual amount of paper sheets, etc.) of the currently-accommodated paper sheets serving as materials.

Figure 5:
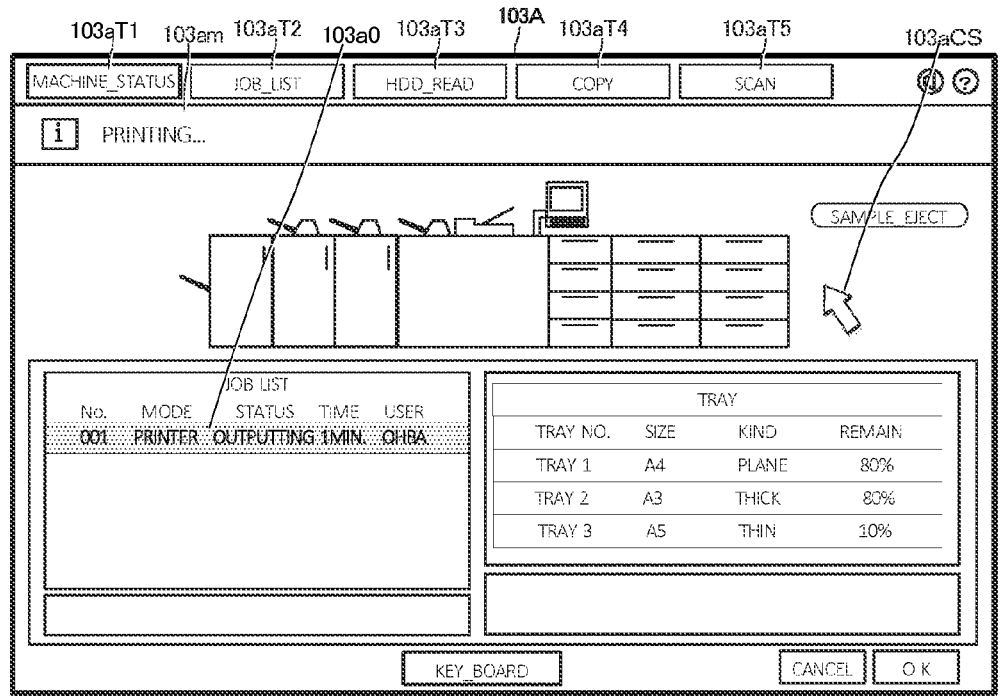
FIG. 5 is an explanatory schematic diagram showing an example of display screens to be displayed in an image forming system in accordance with an embodiment of the present invention.

For instance, as shown in FIG. 5, the display screen to be displayed corresponding to a tub 103aT1 ("MACHINE STATUS") is an example of "display screen corresponding to the apparatus status". However, the scope of the "display screen corresponding to the apparatus status" is not limited to a specific single display screen, but may be grasped as wider meaning such that the "display screen corresponding to the apparatus status" is other than display screens for setting workings.

Further, each of display screens, respectively corresponding to a tub 103aT2 ("JOB LIST"), a tub 103aT3 ("READING HDD (Hard Disc Drive)"), a tub 103aT4 ("COPY") and a tub 103aT5 ("SCANNING"), is provided for implementing a specific processing, and does not fall under the category of the "display screen corresponding to the apparatus status". Now returning to the flowchart, when determining that the display screen, currently displayed on the operating display section 103, does not fall under the category of the "display screen corresponding to the apparatus status" (Step S103; NO, shown in FIG. 3), the control section 101 further determines whether or not the user is in midcourse of implementing a certain setting operation by using the display screen currently displayed on the operating display section 103 (Step S104, shown in FIG. 3).

When determining that the user is in midcourse of implementing a certain setting operation by using the display screen currently displayed on the operating display section 103 (Step S104; YES, shown in FIG. 3), the control section 101 disables the automatic cursor moving function so as not to automatically move the cursor on the operating display section 103 until the concerned setting operation is finalized (Step S104; YES, Step S105; NO, Step S106; NO, shown in FIG. 3).

Further, when determining that the display screen, currently displayed on the operating display section 103, does not fall under the category of the "display screen corresponding to the apparatus status" (Step S103; NO, shown in FIG. 3) and the user is not in midcourse of implementing a certain setting operation on the operating display section 103 (Step S104; NO, shown in FIG. 3), the control section 101 further determines whether or not the concerned user has an authority for coping with the status change (Step S101; YES, shown in FIG. 3) currently occurring (Step S107, shown in FIG. 3).

The above-mentioned authority is established, depending on the user who currently logs in the image forming system and the contents of the status change. Concretely speaking, the usable range of the image forming system is managed by the user management function provided in the control section 101, based on the authority established for every user.

For instance, in a case where the image forming system receives job data from external environment, when a user who owns the concerned job data coincides with a user who is currently operating the image forming system, the control section 101 determines that the concerned user has the authority for coping with the status change in the image forming system concerned. Further, in a case where it is necessary to replenish the concerned apparatus with toner due to a shortage of toner currently stored in the image forming system, and a user who is currently operating the image forming system is a general user or a manager, other than a guest user, the control section 101 determines that the concerned user has the authority for coping with the status change in the image forming system concerned.

Successively, with respect to the status change currently occurring (Step S101; YES, shown in FIG. 3), when determining that the user has an authority for coping with the status change (Step S107; YES, shown in FIG. 3), the control section 101 controls the display controlling function so as to change the display screen, currently displayed on the operating display section 103, to the "display screen corresponding to the apparatus status" (Step S108, shown in FIG. 3).

On the other hand, when determining that the user has no authority for coping with the status change (Step S107; NO, shown in FIG. 3), the control section 101 repeats the status change detecting operation (Step S101, shown in FIG. 3) and the processing Steps following on Step S101, without implementing the automatic cursor moving operation on the operating display section 103 (Step S110, shown in FIG. 3), until all of the operations of the image forming system are deactivated (Step S111, shown in FIG. 3).

Still successively, in a case where the status change is detected (Step S101; YES, shown in FIG. 3) and the control section 101 determines that it is necessary to move the cursor (Step S102; YES, shown in FIG. 3), when determining that the display screen, currently displayed on the operating display section 103, is the "display screen corresponding to the apparatus status" (Step S103; YES, shown in FIG. 3), the control section 101 controls the automatic cursor moving function so as to make the cursor move onto the display screen (Step S109, shown in FIG. 3). Concretely speaking, the control section 101 makes the cursor move onto an object, which corresponds to a processing necessary for coping with the status change concerned, or onto a processing implementation position display that indicates such a position at which a processing necessary for coping with the status change concerned should be implemented, on the screen (Block 3b to Block 3c, shown in FIG. 4).

Further, in a case where the status change is detected (Step S101; YES, shown in FIG. 3) and control section 101 determines that it is necessary to move the cursor (Step S102; YES, shown in FIG. 3), when determining that the display screen, currently displayed on the operating display section 103, is not the "display screen corresponding to the apparatus status" (Step S103; NO, shown in FIG. 3), but the user has finalized the setting operations using the display screen on the operating display section 103 (Step S104; YES and Step S106; YES, shown in FIG. 3), the control section 101 controls the automatic cursor moving function so as to move the cursor on the display screen (Step S109, shown in FIG. 3). Concretely speaking, the control section 101 moves the cursor onto an object, which corresponds to a processing necessary for coping with the status change concerned, or onto a processing implementation position display that indicates such a position at which a processing necessary for coping with the status change concerned should be implemented, on the screen (Block 3b to Block 3c, shown in FIG. 4).

Still successively, in a case where the display screen, currently displayed on the operating display section 103, is not the "display screen corresponding to the apparatus status" (Step S103; NO, shown in FIG. 3), and the user has not finalized the setting operations using the display screen on the operating display section 103 (Step S104; NO, shown in FIG. 3), when determining that the user has the authority for coping with the status change in the image forming system concerned, and accordingly, the control section 101 controls the display controlling function so as to change the display screen to the "display screen corresponding to the apparatus status" (Step S107; YES, shown in FIG. 3), the control section 101 controls the automatic cursor moving function so as to move the cursor on the display screen (Step S109, shown in FIG. 3). Concretely speaking, the control section 101 moves the cursor onto an object, which corresponds to a processing necessary for coping with the status change concerned, or onto a processing implementation position display that indicates such a position at which a processing necessary for coping with the status change concerned should be implemented, on the screen (Block 3*b* to Block 3*c*, shown in FIG. 4).

In this connection, after implementing the automatic cursor moving operation as above-mentioned, the control section 101 repeats the status change detecting operation (Step S101, shown in FIG. 3) and the processing Steps following on Step S101, until all of the operations of the image forming system are deactivated (Step S111, shown in FIG. 3). According to the automatic cursor moving operation as described in the foregoing, since it becomes possible to make the next operation, which is necessary to be implemented by the user's side due to the status change of the apparatus, clear, it becomes possible for the user to employ the pointing device 103*p*, so as to appropriately conduct the operations for implementing the processing by making the cursor move within the operating screen of the GUI (Graphical User Interface).

In this connection, in a case where the automatic cursor moving operation is implemented from Block 3*b* to Block 3*c* in the sequence diagram shown in FIG. 4, Block 4*a* should be selected as the next operation, which is necessary to be implemented by the user's side due to the status change of the apparatus. Then, according to the above-operation implemented by the user's side, the control section 101 controls the cursor depicting operation (Block 4*c*, shown in FIG. 4) and the processing implementation operation (Block 4*d*, shown in FIG. 4).

As well as the above, in a case where the automatic cursor moving operation is implemented from Block 5*b* to Block 5*c* in the sequence chart shown in FIG. 4, Block 6*a* should be selected as the next operation, which is necessary to be implemented by the user's side due to the status change of the apparatus. Then, according to the above-operation implemented by the user's side, the control section 101 controls the cursor depicting operation (Block 6*c*, shown in FIG. 4) and the processing implementation operation (Block 6*d*, shown in FIG. 4).

In this connection, for instance, the cursor moving operation on the display screen will be detailed as follows. When the user makes the pointing device 103*p* move, a cursor manual-moving interruption event is generated in the screen depiction processing. In this connection, the cursor manual-moving interruption event includes coordinate information. According to the display controlling function provided in the control section 101, a cursor image, having a transparent background, is displayed at a position based on the coordinate information, on an image currently displayed within the display screen, so as to create the display screen in such a state that the cursor image is superimposed onto the image currently displayed within the display screen.

Further, when the status change detecting function, provided in the control section 101, detects a status change, such as a job reception, an occurrence of error, etc., the automatic cursor moving function, provided in the control section 101, calculates the coordinate values of the cursor moving destination, corresponding to the above-mentioned moving destination. Then, the status change detecting function and the automatic cursor moving function, both provided in the control section 101, repeatedly calculates the coordinate values of the cursor moving destination for every constant time period from the commencement coordinate position to the destination coordinate position so as to make the cursor gradually approach the moving destination. Then, the cursor image, having a transparent background, is displayed at the position based on the coordinate information, on the image currently displayed within the display screen, so as to create the display screen in such a state that the concerned cursor image is superimposed onto the image currently displayed within the display screen.

<Detailed Operations (1)>

Referring to explanatory schematic diagrams for explaining the display screens, shown in FIGS. 5 and 6, the first example of the detailed operations to be performed in the image forming system in accordance with the embodiment of the present invention will be detailed in the following.

Initially, as shown in FIG. 5, it is assumed that a display screen 103A, corresponding to the tub 103*a*T1 labeled "MACHINE STATUS", is displayed on the operating display section 103, as the status before the automatic cursor moving operation is to be implemented. In the display screen 103A above-mentioned, various kinds of tubs including the tub 103*a*T1, the tub 103*a*T2, the tub 103*a*T3, the tub 103*a*T4, the tub 103*a*T5, which are respectively labeled "MACHINE STATUS", "JOB LIST", "READING HDD (Hard Disc Drive)", "COPY" and "SCANNING" so as to indicate a kind of contents of each of the various display screens, a message display column 103*am*, a front view of the image forming system, a job list, contents of paper sheet feeding tray, etc., are displayed.

According to the above-mentioned screen status, the image forming apparatus 100 is in midcourse of implementing the printing operation based on the job having NO. 001 (job 103*a*0, shown in FIG. 5). Further, the cursor resides at a current position 103*a*CS located in the upper-right area of the display screen.

Figure 6:
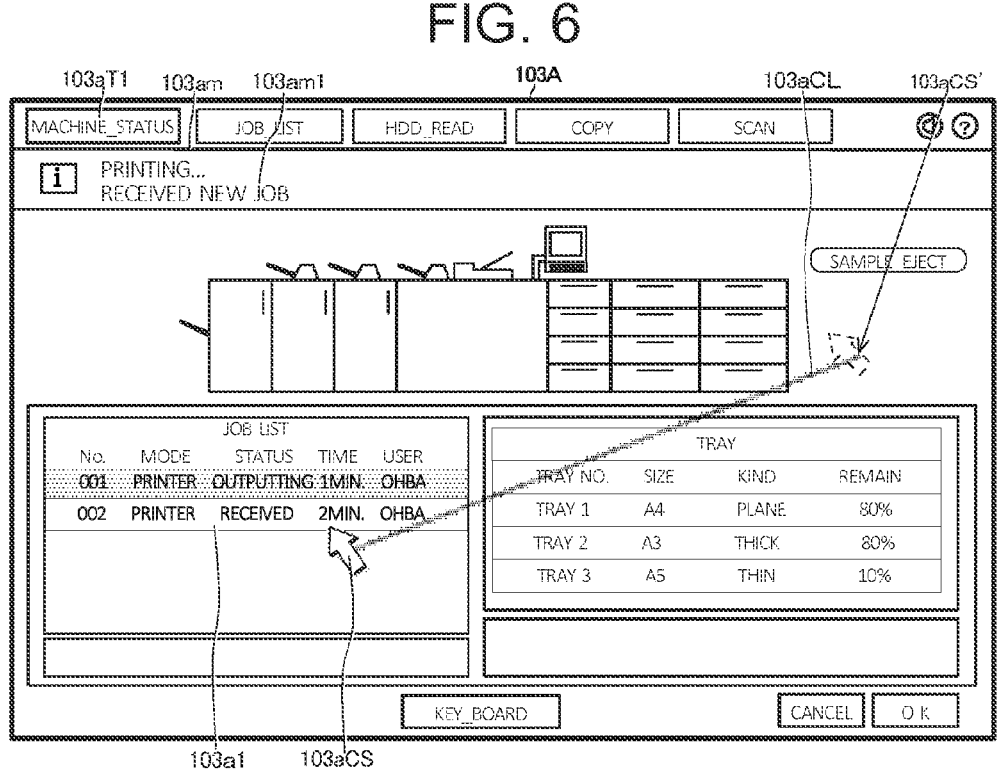
FIG. 6 is an explanatory schematic diagram showing another example of display screens to be displayed in an image forming system in accordance with an embodiment of the present invention.

In this situation, when the image forming apparatus 100 receives job data from the external environment in midcourse of implementing the printing operation, the control section 101 displays a message indicating "A new job has been received!" (message 103*am*1, shown in FIG. 6) in the message display column 103*am*, as indicated in the display screen 103A shown in FIG. 6. Further, when the image forming apparatus 100 receives job data from the external environment in midcourse of implementing the printing operation, the control section 101 adds the received job to the job list concerned (job 103*a*1, shown in FIG. 6), as indicated in the display screen 103A shown in FIG. 6.

In this connection, the control section 101 detects the reception of the new data above-mentioned as an occurrence of the status change aforementioned (Step S101; YES, shown in FIG. 3). In addition, the control section 101 also determines that, due to the reception of the new data above-mentioned, it is necessary for the user to make the cursor move within the display screen in the operating display section 103 in order to determine a processing direction for processing the concerned job data (Step S102, shown in FIG. 3).

Further, since the operating display section 103 is still in midcourse of displaying the display screen corresponding to the "MACHINE STATUS" (Step S103; YES, shown in FIG. 3), the control section 101 controls the automatic cursor moving function so as to make the cursor move on the display screen (Step S109, shown in FIG. 3). Concretely speaking, the control section 101 controls the automatic cursor moving function so as to make the cursor move onto an object, which corresponds to a processing necessary for coping with the status change concerned, or onto a processing implementation position display that indicates such a position at which a processing necessary for coping with the status change concerned should be implemented, on the screen (Step S109, shown in FIG. 3).

In the display screen shown in FIG. 6, the control section 101 makes the cursor, residing at past position 103*a*CS', move to current position 103*a*CS corresponding to the received job having NO. 002 in the job list (job 103a1, shown in FIG. 6). In this connection, at the time of the cursor moving operation, it is desirable that a moving locus 103aCL, which indicates the movement of the cursor on the display screen, is displayed during a predetermined time interval as a notification for the user. By displaying the moving locus 103aCL as above-mentioned, it becomes further clear that the automatic cursor moving operation has been implemented. In addition, it is also desirable as the notification for the user that the cursor, currently residing at the moving destination, is made to be flashing between ON and OFF, or to change its brightness and/or color in accordance with the movement of the cursor so as to make the cursor distinguishable.

As described in the foregoing, since the control section 101 controls the status change detecting function so as to detect the reception of the job as the status change, and then, controls the automatic cursor moving function so as to make the cursor move onto the object corresponding to the commencement of processing the job detected as the status change, it becomes possible to clarify the next necessary operation to be conducted by the user's side (commencement of processing the job), caused by the reception of the job concerned. Concretely speaking, it becomes possible to avoid such the case that the user cannot recognize the message displayed on the display screen, or the user cannot understand what the next necessary operation to be conducted by the user's side is, in response to the message displayed on the display screen.

<Detailed Operations (2)>

Referring to explanatory schematic diagrams for explaining the display screen, shown in FIG. 7, the second example of the detailed operations to be performed in the image forming system in accordance with the embodiment of the present invention will be detailed in the following.

Initially, at the time of commencing the second example of the detailed operations, it is assumed that the display screen 103A, corresponding to the tub 103aT1 labeled "MACHINE STATUS", is displayed on the operating display section 103. Further, it is also assumed that the cursor is displayed at past position 103aCS' of the job having NO. 002, in the display screen 103A, corresponding to the tub 103aT1 labeled "MACHINE STATUS".

During the implementation of the printing operation in the above-mentioned state, when the paper sheets to be currently fed from the paper sheet feeding apparatus 50 or the paper sheet feeding section 105 becomes empty therein, the control section 101 displays a message indicating "Running-out of paper sheet has occurred during printing. Please supply A5 size paper sheets into tray 3! Please confirm detailed procedures by pushing the [DETAIL CONFIRMATION] button." within the message display column 103am in the display screen 103A, as indicated in the schematic diagram of the display screen 103A shown in FIG. 7.

In this connection, the control section 101 detects the fact that the paper sheets accommodated in the tray becomes empty (running-out of paper sheet), as an occurrence of the status change aforementioned (Step S101; YES, shown in FIG. 3). In this connection, although the fact that the paper sheets accommodated in the tray becomes empty is exemplified hereinafter, it is needless to say that such a case where a residual amount of any one of various kinds of material and row materials becomes equal to or lower than a predetermined value, may be regarded as an occurrence of the status change aforementioned.

In addition, the control section 101 also determines that it is necessary for the user to conduct operations for opening and closing the door of the paper sheet feeding section in order to replenish the paper sheet feeding section with appropriate paper sheets, and it is necessary for the user to make the cursor move within the display screen in the operating display section 103 (Step S102, shown in FIG. 3).

Further, since the operating display section 103 is still in midcourse of displaying the display screen corresponding to the "MACHINE STATUS" (Step S103; YES, shown in FIG. 3), the control section 101 controls the automatic cursor moving function so as to make the cursor move on the display screen (Step S109, shown in FIG. 3). Concretely speaking, the control section 101 controls the automatic cursor moving function so as to make the cursor move onto an object, which corresponds to a processing necessary for coping with the status change concerned, or onto a processing implementation position display that indicates such a position at which a processing necessary for coping with the status change concerned should be implemented, on the screen (Step S109, shown in FIG. 3).

Figure 7:
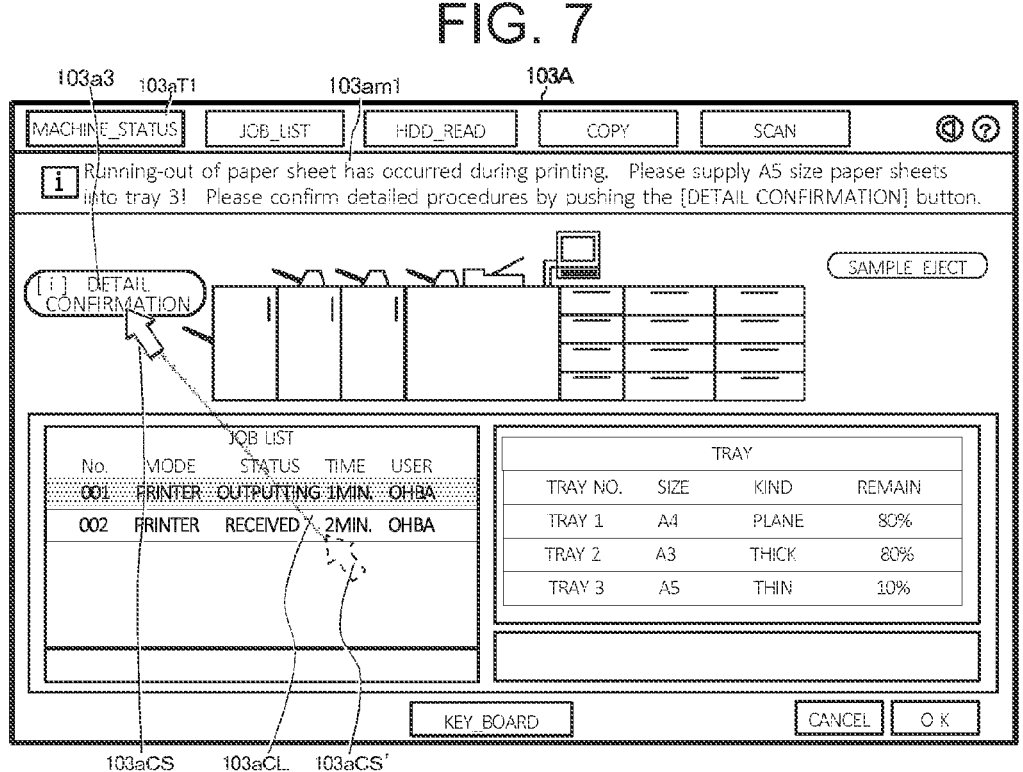
FIG. 7 is an explanatory schematic diagram showing still another example of display screens to be displayed in an image forming system in accordance with an embodiment of the present invention.

In other words, in the display screen shown in FIG. 7, the control section 101 makes the cursor, residing at past position 103aCS', move to current position 103aCS corresponding to the [DETAIL CONFIRMATION] button (button 103a3, shown in FIG. 7).

In this connection, at the time of the cursor moving operation, it is desirable that the moving locus 103aCL, which indicates the movement of the cursor on the display screen, is displayed during a predetermined time interval as a notification for the user. By displaying the moving locus 103aCL as above-mentioned, it becomes further clear that the automatic cursor moving operation has been implemented. In addition, it is also desirable as the notification for the user that the cursor, currently residing at the moving destination, is made to be flashing between ON and OFF, or to change its brightness and/or color in accordance with the movement of the cursor so as to make the cursor distinguishable.

Incidentally, when the user clicks the [DETAIL CONFIRMATION] button serving as the automatic moving destination of the cursor, the control section 101 displays a pop-up screen or the like, in which the detailed procedures, including which door should be opened, which one of paper sheet feeding sections should be replenished with what kind of paper sheets, etc., are indicated in detail.

As described in the foregoing, the control section 101 controls the status change detecting function so as to detect the miming-out of the paper sheets as the status change, and then, controls the automatic cursor moving function so as to make the cursor move onto the [DETAIL CONFIRMATION] button as the corresponding object. Accordingly, in a case where the status change of the apparatus is the running-out of the paper sheets, it becomes possible to clarify the next necessary operation to be conducted by the user's side (operation for displaying the help screen of the paper sheet replenishing method).

Concretely speaking, it becomes possible to avoid such the case that the user cannot recognize the message displayed on the display screen, or the user cannot understand what the next necessary operation to be conducted by the user's side is, in response to the message displayed on the display screen.

<Detailed Operations (3)>

Referring to explanatory schematic diagrams for explaining the display screens, shown in FIG. 8, the third example of the detailed operations to be performed in the image forming system in accordance with the embodiment of the present invention will be detailed in the following Initially, at the time of commencing the third example of the detailed operations, it is assumed that the operations of the image forming apparatus 100 have been deactivated due to the running-out of the paper sheets. Further, it is also assumed that the cursor is displayed at past position 103aCS' of the [DETAIL CONFIRMATION] button in the state that the display screen 103A, corresponding to the tub 103aT1 labeled "MACHINE STATUS", is displayed on the operating display section 103.

In the above-mentioned situation, when the user opens the door of the paper sheet feeding apparatus, replenishes the paper sheet feeding section with paper sheets, and then, closes the door thereof, the control section 101 having the status change detecting function, detects the above-mentioned user's actions as an occurrence of the status change (cancellation of the running-out of paper sheets) aforementioned (Step S101; YES, shown in FIG. 3).

Associating with the cancellation of the running-out of paper sheets, the control section 101 determines that it is necessary to resume the printing operation by an action intentionally performed by the user (action for clicking the [START] button), and it is also necessary to make the cursor move on the display screen currently displayed on the operating display section 103 (Step S102, shown in FIG. 3).

Further, since the operating display section 103 is still in midcourse of displaying the display screen corresponding to the "MACHINE STATUS" (Step S103; YES, shown in FIG. 3), the control section 101 controls the automatic cursor moving function so as to make the cursor move on the display screen (Step S109, shown in FIG. 3). Concretely speaking, the control section 101 controls the automatic cursor moving function so as to make the cursor move onto an object, which corresponds to a processing necessary for coping with the status change concerned, or onto a processing implementation position display that indicates such a position at which a processing necessary for coping with the status change concerned should be implemented, on the screen (Step S109, shown in FIG. 3).

Further, in the above-mentioned state, at the time when the paper sheet feeding section is replenished with the paper sheets and the door of the paper sheet feeding section is closed, the control section 101 displays a message indicating "Operation for replenishing the paper sheet feeding section with paper sheets is completed. Please push the [START] button to resume the printing operation." within the message display column 103am in the display screen 103A, as indicated in the schematic diagram of the display screen 103A shown in FIG. 8.

Figure 8:
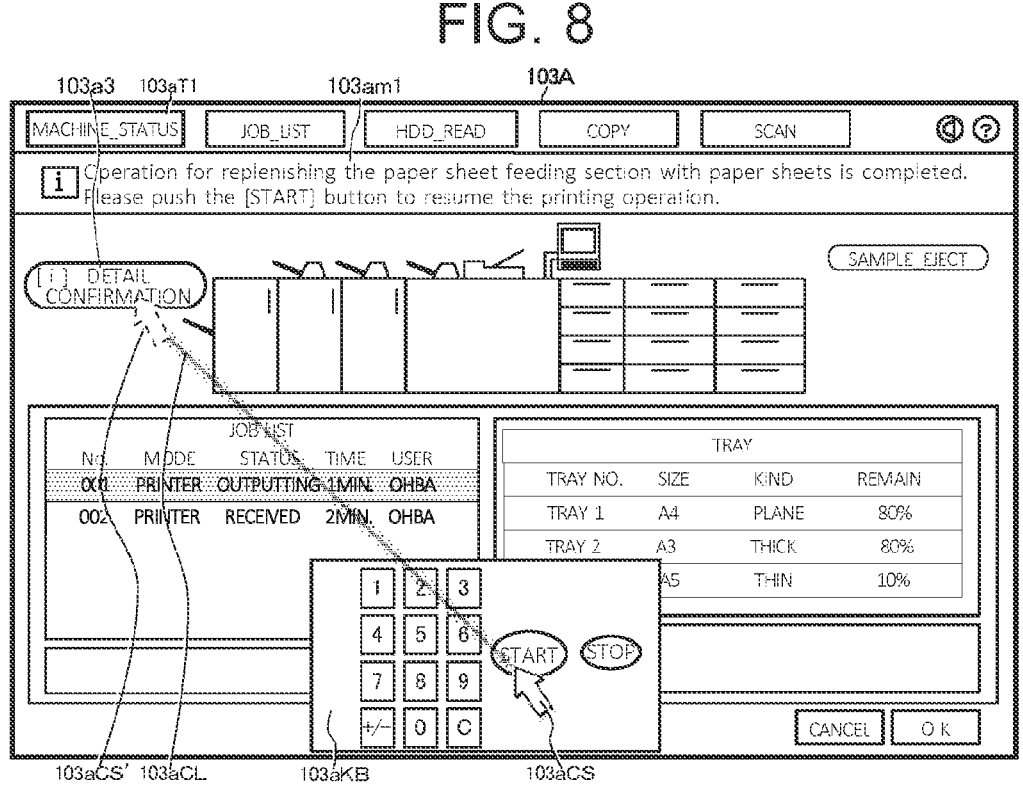
FIG. 8 is an explanatory schematic diagram showing still another example of display screens to be displayed in an image forming system in accordance with an embodiment of the present invention.

Concretely speaking, as shown in FIG. 8, the control section 101 displays a pop-up screen 103aKB including the [START] button, and at the same time, makes the cursor, residing at past position 103aCS' (position of the [DETAIL CONFIRMATION] button), move to current position 103aCS corresponding to the [START] button (position 103aCS, shown in FIG. 7).

In this connection, at the time of the cursor moving operation, it is desirable that the moving locus 103aCL, which indicates the movement of the cursor on the display screen, is displayed during a predetermined time interval as a notification for the user. By displaying the moving locus 103aCL as above-mentioned, it becomes further clear that the automatic cursor moving operation has been implemented. In addition, it is also desirable as the notification for the user that the cursor, currently residing at the moving destination, is made to be flashing between ON and OFF, or to change its brightness and/or color in accordance with the movement of the cursor so as to make the cursor distinguishable.

Then, the user clicks the [START] button residing at the cursor moving destination so that the control section 101 conducts the controlling operations for resuming the printing operation currently halted. As described in the foregoing, the control section 101 controls the status change detecting function so as to detect the cancellation of the running-out of the paper sheets as the status change, and then, controls the automatic cursor moving function so as to make the cursor move onto the [START] button as the corresponding object. Accordingly, in a case where the status change of the apparatus is the running-out of the paper sheets, it becomes possible to clarify the next necessary operation to be conducted by the user's side (operation for depressing the [START] button to instruct the control section 101 to resume the printing operation).

Concretely speaking, it becomes possible to avoid such the case that the user cannot recognize the message displayed on the display screen, or the user cannot understand what the next necessary operation to be conducted by the user's side is, in response to the message displayed on the display screen.

<Detailed Operations (4)>

Referring to explanatory schematic diagrams for explaining the display screens, shown in FIGS. 9 through 13, as the fourth example of the detailed operations to be performed in the image forming system in accordance with the embodiment of the present invention, the automatic adjustment operations at the time of parts change will be detailed in the following.

Initially, it is assumed that, at the time of commencing the forth example of the detailed operations, the display screen 103A' titled "AUTOMATIC ADJUSTMENT OPERATIONS AT THE TIME OF PARTS CHANGE", serving as various kinds of adjustment operations to be implemented at the time when the user has changed certain parts, is displayed.

Figure 9:
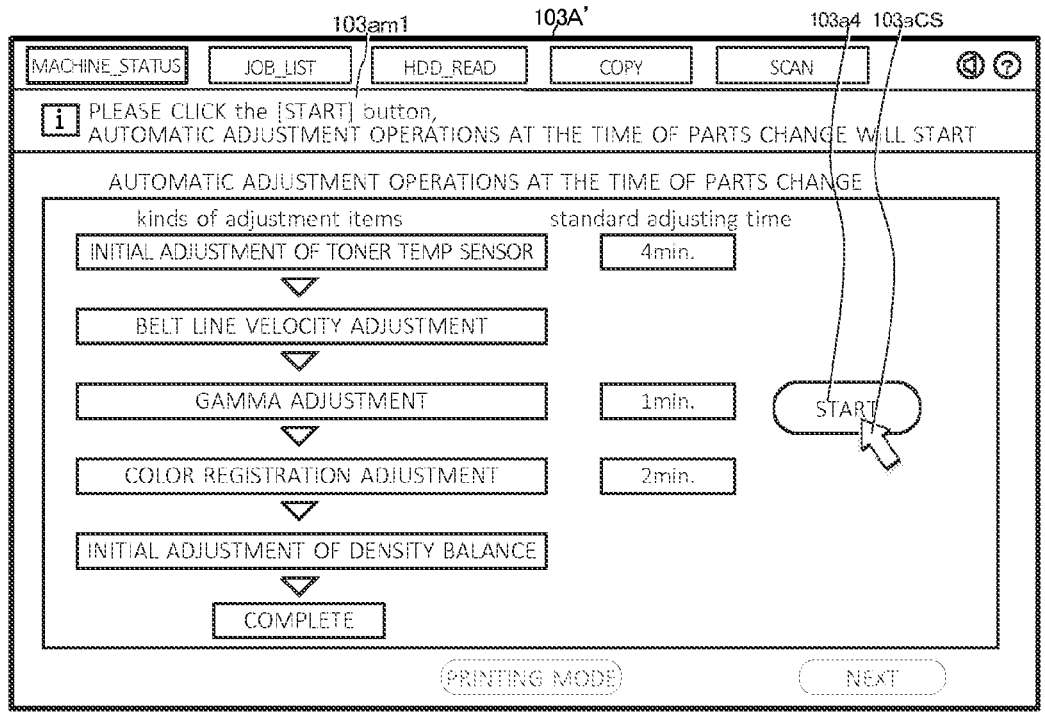
FIG. 9 is an explanatory schematic diagram showing still another example of display screens to be displayed in an image forming system in accordance with an embodiment of the present invention.

In the display screen 103A' of the "AUTOMATIC ADJUSTMENT OPERATIONS AT THE TIME OF PARTS CHANGE" shown in FIG. 9, the various kinds of adjustment items, including "INITIAL ADJUSTMENT OF TONER TEMPERATURE SENSOR", "BELT LINE VELOCITY ADJUSTMENT", "GAMMA ADJUSTMENT", "COLOR REGISTRATION ADJUSTMENT" and "INITIAL ADJUSTMENT OF DENSITY BALANCE", are displayed. Further, a [START] button 103a4, etc. are also displayed within the display screen 103A'. In this connection, each of the above-mentioned adjustment items falls under the category of either an automatic adjustment item or a manual adjustment item. Further, each of the adjustment items, to which a standard adjusting time is attached, is indicated as the automatic adjustment item.

Figure 10:
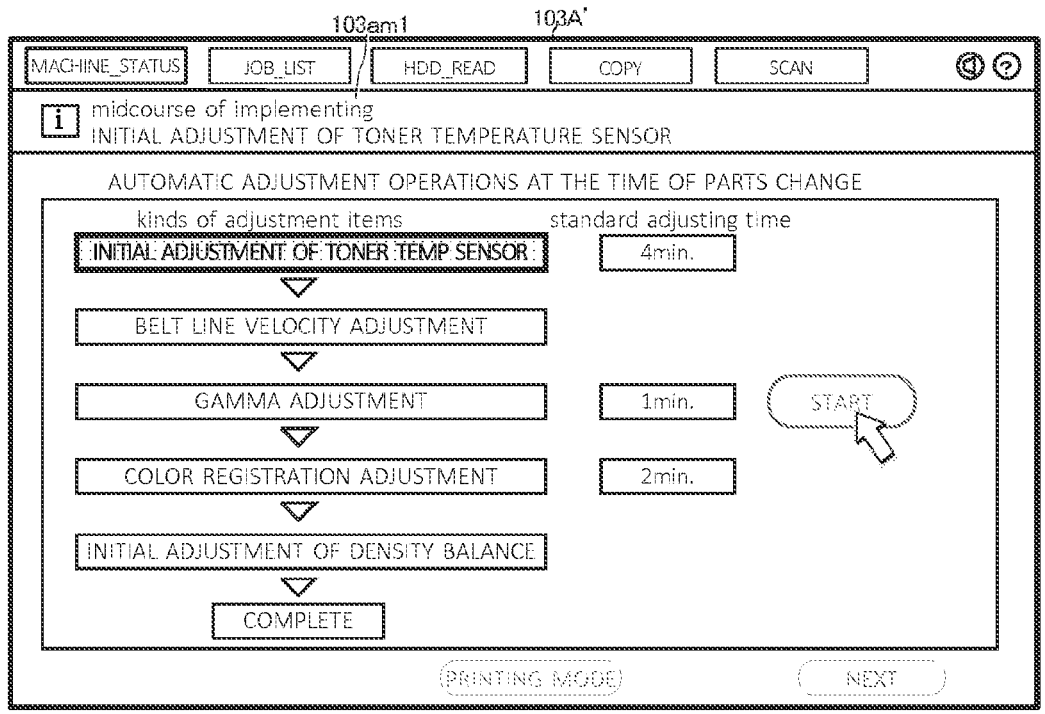
FIG. 10 is an explanatory schematic diagram showing still another example of display screens to be displayed in an image forming system in accordance with an embodiment of the present invention.

In this connection, in the display screen 103A' of the "AUTOMATIC ADJUSTMENT OPERATIONS AT THE TIME OF PARTS CHANGE", a [PRINTING MODE] button and a [NEXT] button are displayed with a pale color indicating an invalid status thereof, until the operations for adjusting all of the adjustment items are completed. At the time when the user clicks the [START] button 103a4, the control section 101 controls the concerned sections so as to start the "AUTOMATIC ADJUSTMENT OPERATIONS AT THE TIME OF PARTS CHANGE" to be performed in this order of the adjustment items currently displayed. FIG. 10 shows a schematic diagram indicating the display screen 103A' to be displayed in midcourse of implementing the "INITIAL ADJUSTMENT OF TONER TEMPERATURE SENSOR".

Figure 11:
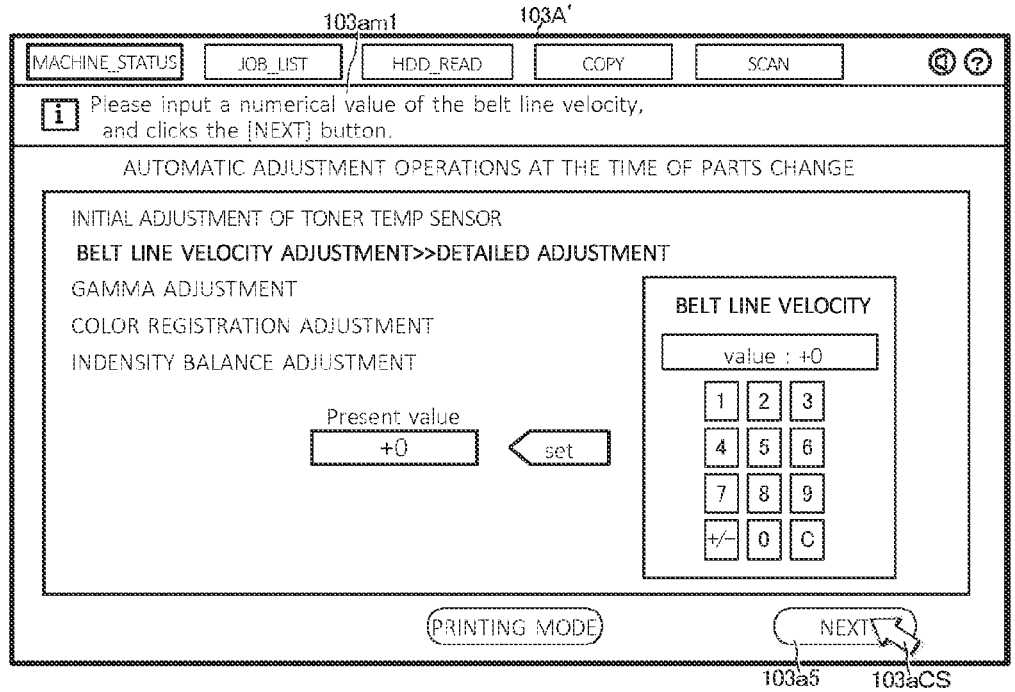
FIG. 11 is an explanatory schematic diagram showing still another example of display screens to be displayed in an image forming system in accordance with an embodiment of the present invention.

Successively, FIG. 11 shows a schematic diagram indicating the display screen 103A' to be displayed in midcourse of implementing the detailed adjustments during the "BELT LINE VELOCITY ADJUSTMENT", serving as the second adjustment item shown in FIG. 10. In the schematic diagram shown in FIG. 11, the user inputs a numerical value of the belt line velocity and clicks the [NEXT] button 103a5. Then, the control section 101 completes the "BELT LINE VELOCITY ADJUSTMENT" and shifts the controlling operation to the "GAMMA ADJUSTMENT" serving as the next adjustment item thereof.

Figure 12:
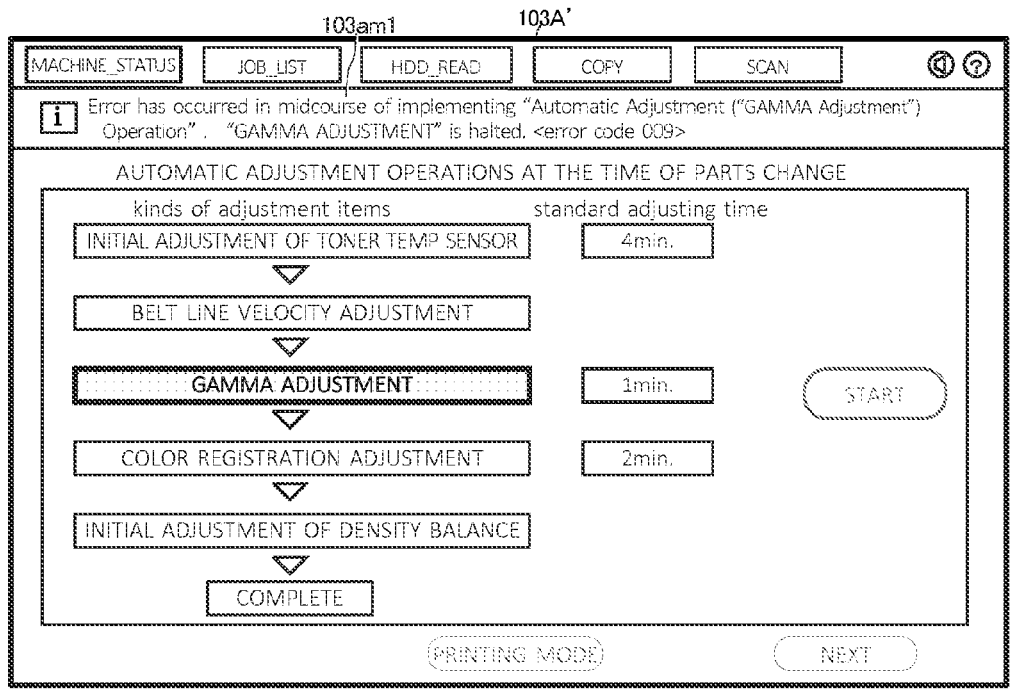
FIG. 12 is an explanatory schematic diagram showing still another example of display screens to be displayed in an image forming system in accordance with an embodiment of the present invention.

Still successively, FIG. 12 shows a schematic diagram indicating the display screen 103A' displaying such a state that the "GAMMA ADJUSTMENT" is temporarily halted, due to occurrence of an error caused by the fact that the front door of the apparatus is abruptly opened in midcourse of implementing the "GAMMA ADJUSTMENT" serving as the third adjustment item of the "AUTOMATIC ADJUSTMENT OPERATIONS AT THE TIME OF PARTS CHANGE". On this situation, the control section 101 conducts necessary controlling operations so as to halt the "GAMMA ADJUSTMENT" from the safety point of view. In addition to the above, the control section 101 conducts necessary controlling operations so as to display a message indicating the halt of the "GAMMA ADJUSTMENT" on the message display column 103am of the display screen 103A'. Incidentally, indicated in the schematic diagram shown in FIG. 12, is such a state that the message, indicating "Error has occurred in midcourse of implementing "AUTOMATIC ADJUSTMENT OPERATION" ("GAMMA ADJUSTMENT"). "GAMMA ADJUSTMENT" is halted. <error code 009>", is displayed within the message display column 103am.

In the above-mentioned situation, when the user closes the door currently opened, the control section 101 provided with the status change detecting function detects the above-mentioned user's actions as an occurrence of the status change aforementioned (cancellation of the open state of the door) (Step S101; YES, shown in FIG. 3).

Associating with the cancellation of the open state of the door, the control section 101 determines that it is necessary to resume the printing operation by an action intentionally performed by the user (action for clicking the [START] button), and it is also necessary to make the cursor move on the display screen currently displayed on the operating display section 103 (Step S102, shown in FIG. 3).

Further, since the operating display section 103 is still in midcourse of displaying the display screen corresponding to the "MACHINE STATUS" (Step S103; YES, shown in FIG. 3), the control section 101 controls the automatic cursor moving function so as to make the cursor move on the display screen (Step S109, shown in FIG. 3). Concretely speaking, the control section 101 controls the automatic cursor moving function so as to make the cursor move onto an object, which corresponds to a processing necessary for coping with the status change concerned, or onto a position of the [START] button 103a4 (current position 103aCS), serving as a processing implementation position display that indicates such a position at which a processing necessary for coping with the status change concerned should be implemented, on the screen (Step S109, shown in FIG. 3).

Further, in the above-mentioned state, at the time when the door, currently opened by the user, is closed, the control section 101 displays a message indicating "Error is cancelled. Please push the [START] button to resume the printing operation." within the message display column 103am, as indicated in the display screen 103A' shown in FIG. 13.

In this connection, at the time of the cursor moving operation, it is desirable that the moving locus 103aCL, which indicates the movement of the cursor on the display screen, is displayed during a predetermined time interval as a notification for the user. By displaying the moving locus 103aCL as above-mentioned, it becomes further clear that the automatic cursor moving operation has been implemented. In addition, it is also desirable as the notification for the user that the cursor, currently residing at the moving destination, is made to be flashing between ON and OFF, or to change its brightness and/or color in accordance with the movement of the cursor so as to make the cursor distinguishable.

Then, the user clicks the [START] button residing at the cursor moving destination so that the control section 101 conducts the controlling operations for resuming the "GAMMA ADJUSTMENT" of the "AUTOMATIC ADJUSTMENT OPERATIONS" currently halted.

As described in the foregoing, the control section 101 controls the status change detecting function so as to detect the cancellation of the occurrence of the error as the status change, and then, controls the automatic cursor moving function so as to make the cursor move onto the [START] button as the corresponding object. Accordingly, in a case where the status change of the apparatus is the cancellation of the occurrence of the error, it becomes possible to clarify the next necessary operation to be conducted by the user's side (operation for depressing the [START] button to instruct the control section 101 to resume the latest one of the "AUTOMATIC ADJUSTMENT OPERATIONS".

Concretely speaking, it becomes possible to avoid such the case that the user cannot recognize the message displayed on the display screen, or the user cannot understand what the next necessary operation to be conducted by the user's side is, in response to the message displayed on the display screen.

Figure 13:
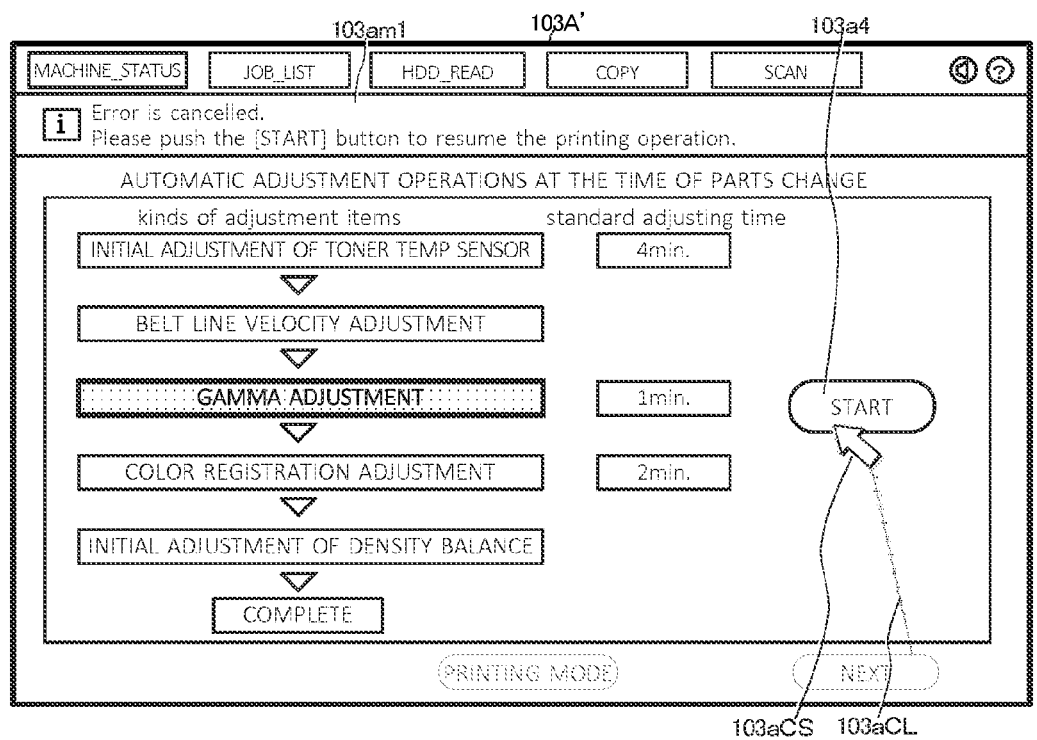
FIG. 13 is an explanatory schematic diagram showing still another example of display screens to be displayed in an image forming system in accordance with an embodiment of the present invention.

In this connection, it is also applicable that, during the time when the display screen 103A' shifts from the display status shown in FIG. 12 to that shown in FIG. 13, the control section 101 controls the automatic cursor moving function so as to display a help screen for cancelling (eliminating) the error at the time of error occurrence, though it is not shown in the drawings, hereinafter.

<Detailed Operations (5)>

Referring to explanatory schematic diagrams for explaining the display screens, shown in FIGS. 14 and 15, the fifth example of the detailed operations to be performed in the image forming system in accordance with the embodiment of the present invention, will be detailed in the following. Herein, it is assumed that the display screen 103A corresponding to the "MACHINE STATUS" during the implementation of the printing operation, which is same as that already described by referring to the explanatory schematic diagram shown in FIG. 5, is displayed on the operating display section 103.

In this situation, when a jamming error (paper jam) has occurred while the image forming apparatus 100 is implementing the printing operation, the control section 101 displays a message indicating "A jamming error has occurred in midcourse of implementing the printing operation. Please confirm jammed paper sheets." within the message display column 103am, as indicated in the display screen 103A shown in FIG. 14 (message display column 103*am*1, shown in FIG. 14). Further, as indicated in the display screen 103A shown in FIG. 14, the control section 101 depicts jam positional symbols (positional symbol 103*a*6 residing within the paper sheet feeding apparatus and positional symbol 103*a*7 residing within the image forming apparatus, both shown in FIG. 14) at which the concerned paper jams currently occur, into the front view of the image forming system (front view 103*ag*1, shown in FIG. 14).

In this connection, the control section 101 provided with the status change detecting function detects the above-mentioned jam occurrence as an occurrence of the status change aforementioned (Step S101; YES, shown in FIG. 3). With respect to the jam occurrence above-mentioned, the control section 101 determines that it is necessary to make the cursor move on the display screen currently displayed on the operating display section 103 (Step S102, shown in FIG. 3) in order to urge the user to perform the concerned jam processing (operation for removing the jammed paper sheets).

Further, since the operating display section 103 is still in midcourse of displaying the display screen corresponding to the "MACHINE STATUS" (Step S103; YES, shown in FIG. 3), the control section 101 controls the automatic cursor moving function so as to make the cursor move on the display screen (Step S109, shown in FIG. 3). Concretely speaking, the control section 101 controls the automatic cursor moving function so as to make the cursor move onto an object, which corresponds to a processing necessary for coping with the status change concerned, or onto a processing implementation position display that indicates such a position at which a processing necessary for coping with the status change concerned should be implemented, on the screen (Step S109, shown in FIG. 3).

Figure 14:
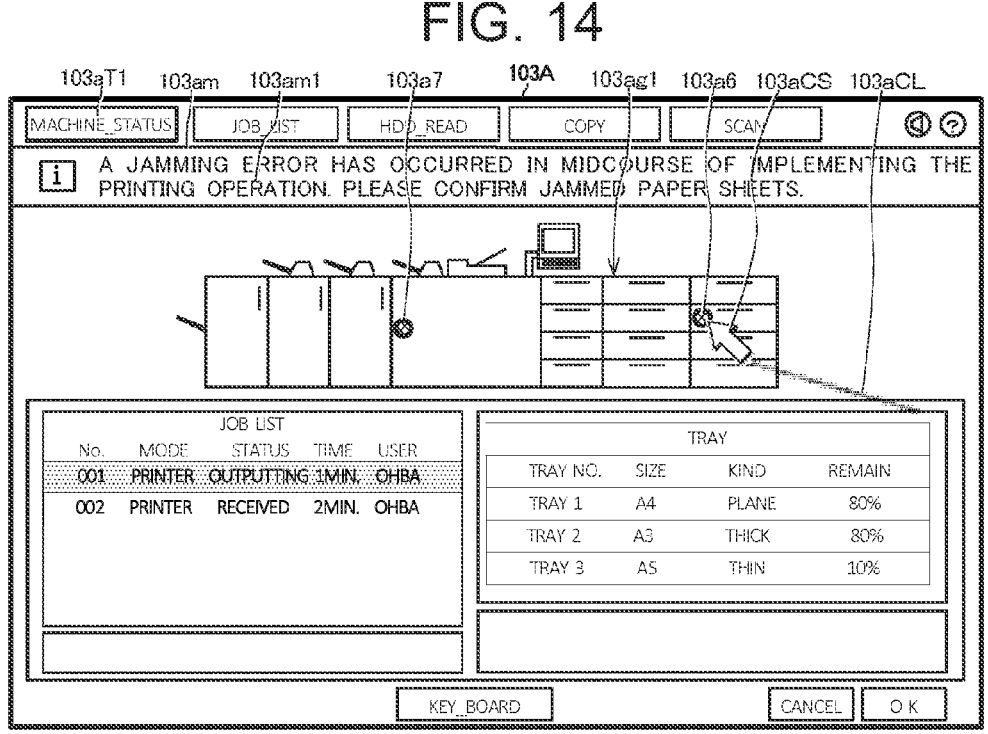
FIG. 14 is an explanatory schematic diagram showing still another example of display screens to be displayed in an image forming system in accordance with an embodiment of the present invention.

In the display screen shown in FIG. 14, the control section 101 controls the automatic cursor moving function so as to make the cursor, currently residing at someplace within the display screen 103A, onto the positional symbol 103*a*6 indicating the jam occurrence position (current position 103*a*CS, shown in FIG. 14). In this connection, at the time of the cursor moving operation, it is desirable that the moving locus 103*a*CL, which indicates the movement of the cursor on the display screen, is displayed during a predetermined time interval as a notification for the user. By displaying the moving locus 103*a*CL as above-mentioned, it becomes further clear that the automatic cursor moving operation has been implemented. In addition, it is also desirable as the notification for the user that the cursor, currently residing at the moving destination, is made to be flashing between ON and OFF, or to change its brightness and/or color in accordance with the movement of the cursor so as to make the cursor distinguishable.

As described in the foregoing, the control section 101 controls the status change detecting function so as to detect the jam occurrence as the status change, and then, controls the automatic cursor moving function so as to make the cursor move onto the positional symbol corresponding to the jam occurrence position. Accordingly, in a case where the status change of the apparatus is the jam occurrence, it becomes possible to clarify the next necessary operation to be conducted by the user's side (operations for confirming the jam occurrence position and for confirming the jam processing procedure), caused by the jam occurrence.

In the above-mentioned case, it is possible for the user to confirm a guidance display screen of the jam processing procedure concerned, by performing a right-clicking action or the like at the current position 103*a*CS of the cursor of the positional symbol 103*a*6 serving as the first jam occurrence position. In other words, it becomes possible to avoid such the case that the user cannot recognize the message displayed on the display screen, or the user cannot understand what the next necessary operation to be conducted by the user's side is, in response to the message displayed on the display screen.

Further, referring to the schematic diagram shown in FIG. 15, such a case that the user has completed the jam processing according to the display screen 103A shown in FIG. 14, but has not cancelled the other jam yet, will be detailed in the following. Herein, the still-existing jam (residing at the positional symbol 103*a*7, shown in FIG. 15) is already detected as the status change aforementioned by the control section 101 having the status change detecting function (Step S101; YES, shown in FIG. 3).

Still further, with respect to the occurrence of the still-existing jam above-mentioned, the control section 101 determines that it is necessary to make the cursor move on the display screen currently displayed on the operating display section 103 (Step S102, shown in FIG. 3) in order to urge the user to perform the concerned jam processing (operation for removing the jammed paper sheets). Further, since the operating display section 103 is still in midcourse of displaying the display screen corresponding to the "MACHINE STATUS" (Step S103; YES, shown in FIG. 3), the control section 101 controls the automatic cursor moving function so as to make the cursor move on the display screen (Step S109, shown in FIG. 3). Concretely speaking, the control section 101 controls the automatic cursor moving function so as to make the cursor move onto an object, which corresponds to a processing necessary for coping with the status change concerned, or onto a processing implementation position display that indicates such a position at which a processing necessary for coping with the status change concerned should be implemented, on the screen (Step S109, shown in FIG. 3).

Figure 15:
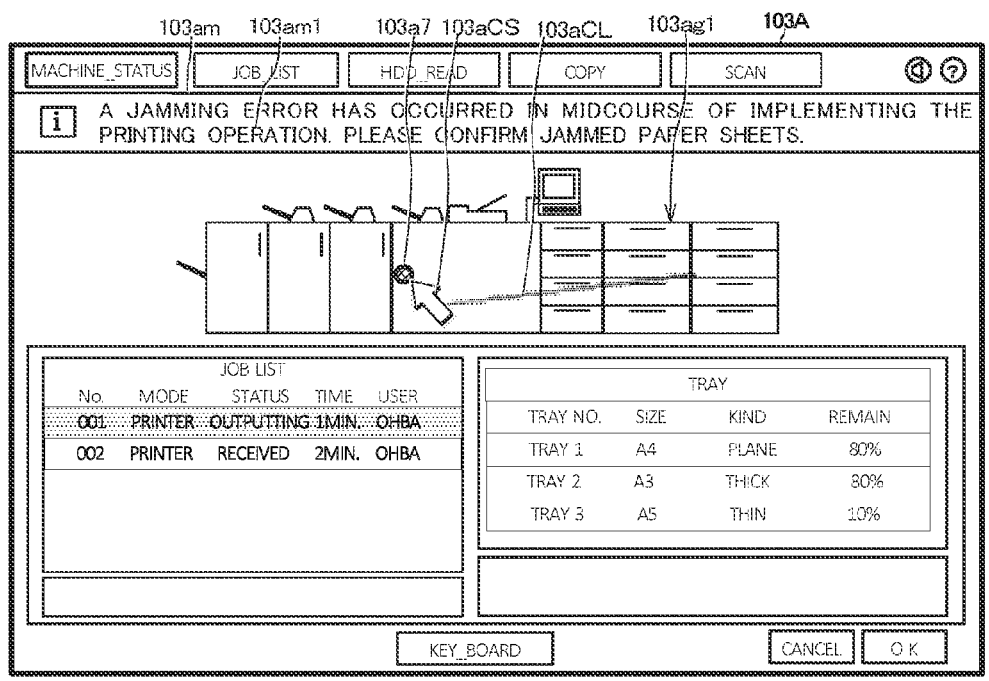
FIG. 15 is an explanatory schematic diagram showing still another example of display screens to be displayed in an image forming system in accordance with an embodiment of the present invention.

In the above-mentioned case, at the time when the jammed paper sheet residing at the positional symbol 103*a*6, shown in FIG. 14, has been removed and the concerned door is closed, the control section 101 controls the automatic cursor moving function so as to make the cursor move onto the positional symbol 103*a*7 (current position 103*a*CS, shown in FIG. 15). In this connection, at the time of the automatic cursor moving operation above-mentioned, it is desirable as the notification for the user that the moving locus 103*a*CL, which indicates the movement of the cursor on the display screen, is displayed during a predetermined time interval, and/or the cursor, currently residing at the moving destination, is made to be flashing between ON and OFF, or to change its brightness and/or color in accordance with the movement of the cursor so as to make the cursor distinguishable.

As described in the foregoing, the control section 101 controls the status change detecting function so as to detect the jam occurrence as the status change, and then, controls the automatic cursor moving function so as to make the cursor move onto the positional symbol corresponding to the jam occurrence position. Accordingly, in a case where the status change of the apparatus is the jam occurrence, it becomes possible to clarify the next necessary operation to be conducted by the user's side (operations for confirming the jam occurrence position and for confirming the jam processing procedure), caused by the jam occurrence. In other words, it becomes possible to avoid such the case that the user cannot recognize the message displayed on the display screen, or the user cannot understand what the next necessary operation to be conducted by the user's side is, in response to the message displayed on the display screen.

In this connection, although such a case that two paper jams have occurred, has been exemplified hereinabove, it is needless to say that, even in a case where three or more paper jams have occurred, by repeating the automatic cursor moving operation being same as the above-mentioned until all of the paper jams have been cancelled, it becomes possible to clarify the next necessary operation to be conducted by the user's side (operations for confirming the jam occurrence position and for confirming the jam processing procedure), caused by the jam occurrence. In addition, with respect to the replenishment of paper sheets serving as materials and the parts changing operations in each of the various kinds of sections, etc., it becomes possible to clarify the necessary operation to be conducted by the user's side, as well.

<Detailed Operations (6)>

Referring to explanatory schematic diagrams for explaining the display screens, shown in FIGS. 16 and 17, as the sixth example of the detailed operations to be performed in the image forming system in accordance with the embodiment of the present invention, the adjusting operation in regard to the accommodating status of paper sheets serving as materials, namely, a tray residual amount detecting adjustment will be detailed in the following. Initially, it is assumed that, at the time of commencing the sixth example of the detailed operations of the image forming system, the user operates the operating display section 103 in order of a service mode menu screen, a machine adjustment, a tray adjustment and a tray residual amount detecting adjustment so as to finally display the display screen 103A' of the tray residual amount detecting adjustment, as indicated in the schematic diagram shown in FIG. 16.

In the display screen 103A' of the tray residual amount detecting adjustment, the items of "DETECTION LOWER LIMIT ADJUSTMENT OF TRAY 1", "DETECTION UPPER LIMIT ADJUSTMENT OF TRAY 1", "DETECTION LOWER LIMIT ADJUSTMENT OF TRAY 2", "DETECTION UPPER LIMIT ADJUSTMENT OF TRAY 2", "DETECTION LOWER LIMIT ADJUSTMENT OF TRAY 3" AND "DETECTION UPPER LIMIT ADJUSTMENT OF TRAY 3" are currently displayed as the adjustment items. In addition, the [START] button, etc. are also displayed therein.

Successively, the cursor is moved to current position 103aCS of the "DETECTION LOWER LIMIT ADJUSTMENT OF TRAY 1" and clicked by the user. Then, the control section 101 conducts controlling operations to commence the preparation of the "DETECTION LOWER LIMIT ADJUSTMENT OF TRAY 1".

Figure 16:
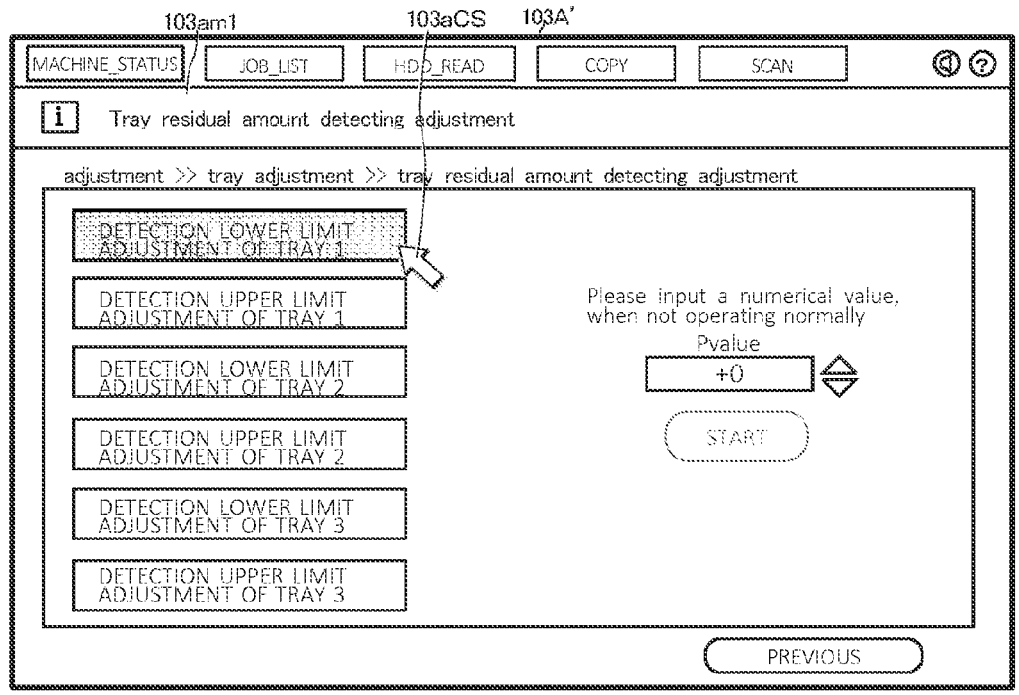
FIG. 16 is an explanatory schematic diagram showing still another example of display screens to be displayed in an image forming system in accordance with an embodiment of the present invention.

In this connection, in the display screen 103A' of the tray residual amount detecting adjustment, in a case where the tray lower limit detecting adjustment is selected and paper sheets are still accommodated in the designated tray, the [START] button is displayed with a pale color indicating an invalid status thereof, as shown in FIG. 16. As well as the above, in a case where the tray upper limit detecting adjustment is selected and a predetermined number of paper sheets is not accommodated in the designated tray, the [START] button is displayed with a pale color indicating an invalid status thereof.

At this time, the user removes all of the paper sheets from the tray 1 and sets the tray 1. Then, the control section 101 having the status change detecting function detects the above-mentioned action as an occurrence of the aforementioned status change (completion of the preparation of the "DETECTION LOWER LIMIT ADJUSTMENT OF TRAY 1").

Associating with the completion of the preparation of the "DETECTION LOWER LIMIT ADJUSTMENT OF TRAY 1", the control section 101 determines that it is necessary to start the adjusting operation by an action intentionally performed by the user (action for clicking the [START] button), and it is also necessary to make the cursor move on the display screen currently displayed on the operating display section 103.

Figure 17:
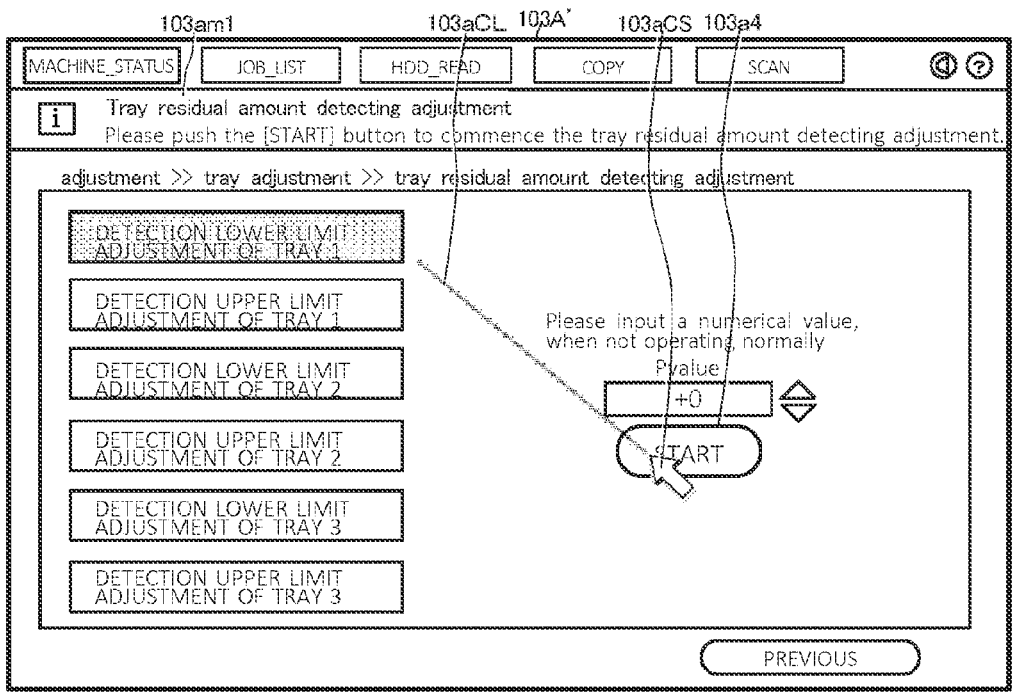
FIG. 17 is an explanatory schematic diagram showing still another example of display screens to be displayed in an image forming system in accordance with an embodiment of the present invention.

Accordingly, the control section 101 controls the automatic cursor moving function so as to make the cursor move onto an object, which corresponds to a processing necessary for coping with the status change concerned, or onto a position of the [START] button (current position 103aCS), serving as a processing implementation position display that indicates such a position at which a processing necessary for coping with the status change concerned should be implemented, on the screen, as shown in FIG. 17. Further, the control section 101 displays a message indicating "Please push the [START] button to commence the tray residual amount detecting adjustment." within the message display column 103am, as indicated in the schematic diagram of the display screen 103A' shown in FIG. 17.

In this connection, at the time of the cursor moving operation, it is desirable that the moving locus 103aCL, which indicates the movement of the cursor on the display screen, is displayed during a predetermined time interval as a notification for the user. By displaying the moving locus 103aCL as above-mentioned, it becomes further clear that the automatic cursor moving operation has been implemented. In addition, it is also desirable as the notification for the user that the cursor, currently residing at the moving destination, is made to be flashing between ON and OFF, or to change its brightness and/or color in accordance with the movement of the cursor so as to make the cursor distinguishable.

Then, the user clicks the [START] button residing at the cursor moving destination so that the control section 101 conducts the controlling operations for commencing the "DETECTION LOWER LIMIT ADJUSTMENT OF TRAY 1". In this connection, the "DETECTION LOWER LIMIT ADJUSTMENT" of each of the other trays is also implemented in the same manner as above-mentioned. Further, in a case of the "DETECTION UPPER LIMIT ADJUSTMENT", when a predetermined number of paper sheets is stacked onto the tray selected by the user, the cursor is automatically moved to the current position 103aCS, and then, the concerned adjustment is commenced in the same manner as above-mentioned.

As described in the foregoing, based on the paper sheet stacking status at the time of implementing the tray residual amount detecting adjustment, the control section 101 controls the status change detecting function so as to detect the completion of the preparation for the adjustment as the status change, and then, controls the automatic cursor moving function so as to make the cursor move onto the [START] button as the corresponding object. Accordingly, in a case where the status change of the apparatus is the completion of the preparation for the adjustment, it becomes possible to clarify the next necessary operation to be conducted by the user's side (operation for depressing the [START] button to instruct the control section 101 to start the adjusting operations), caused by the completion of the preparation concerned.

Concretely speaking, it becomes possible to avoid such the case that the user cannot recognize the message displayed on the display screen, or the user cannot understand what the next necessary operation to be conducted by the user's side is, in response to the message displayed on the display screen.

In this connection, it is also applicable that the control section 101 controls the automatic cursor moving function so as to display a help screen for cancelling (eliminating) the error at the time of error occurrence, though it is not shown in the drawings, hereinafter.

<Modified Example of Detailed Operations (1)>

Referring to explanatory schematic diagrams for explaining the display screens, shown in FIGS. 18 and 19, the fifth example of the detailed operations to be performed in the image forming system in accordance with the embodiment of the present invention, will be detailed in the following. Herein, referring to the display screen 103A shown in FIG. 6 as a concrete example, a modified example of the moving path will be detailed in the following.

In this modified example, when implementing the automatic cursor moving operation, the control section 101 controls the automatic cursor moving function so as not to make the cursor overlap with character information included in an object, such as a button, a tub, an icon, etc., at the moving destination.

Figure 18:
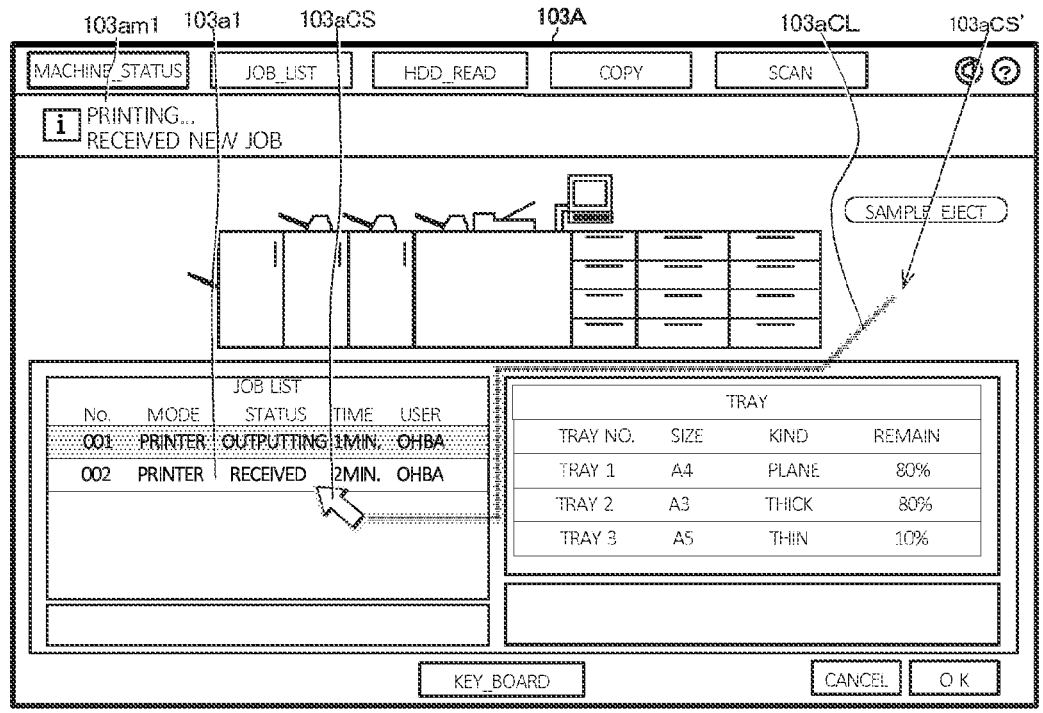
FIG. 18 is an explanatory schematic diagram showing still another example of display screens to be displayed in an image forming system in accordance with an embodiment of the present invention.

As well as the above, when implementing the automatic cursor moving operation, the control section 101 controls the automatic cursor moving function so as not to make the cursor overlap with various kinds of characters (such as characters written in the job list, characters included in the paper sheet information, etc., in the schematic diagram shown in FIG. 18), various kinds of frame lines enclosing the various kinds of character information written as a list format, various kinds of graphical images (such as a front view of the image forming system, etc., in the schematic diagram shown in FIG. 18). In this connection, since it is impossible to completely avoid the intersection between the cursor and the frame line during the cursor moving operation, it is desirable that a number of intersections thereof is limited to a minimum value.

In the exemplified schematic diagram shown in FIG. 18 corresponding to the display screen 103A shown in FIG. 6, the cursor residing at past position 103aCS' in the right-upper area of the display screen 103A is made to move to current position 103aCS corresponding to the received job having NO. 002 in the job list, while avoiding overlaps with the graphics of the front view of the image forming system, the paper sheet tray information and the job list information, as shown in FIG. 18.

Figure 19:
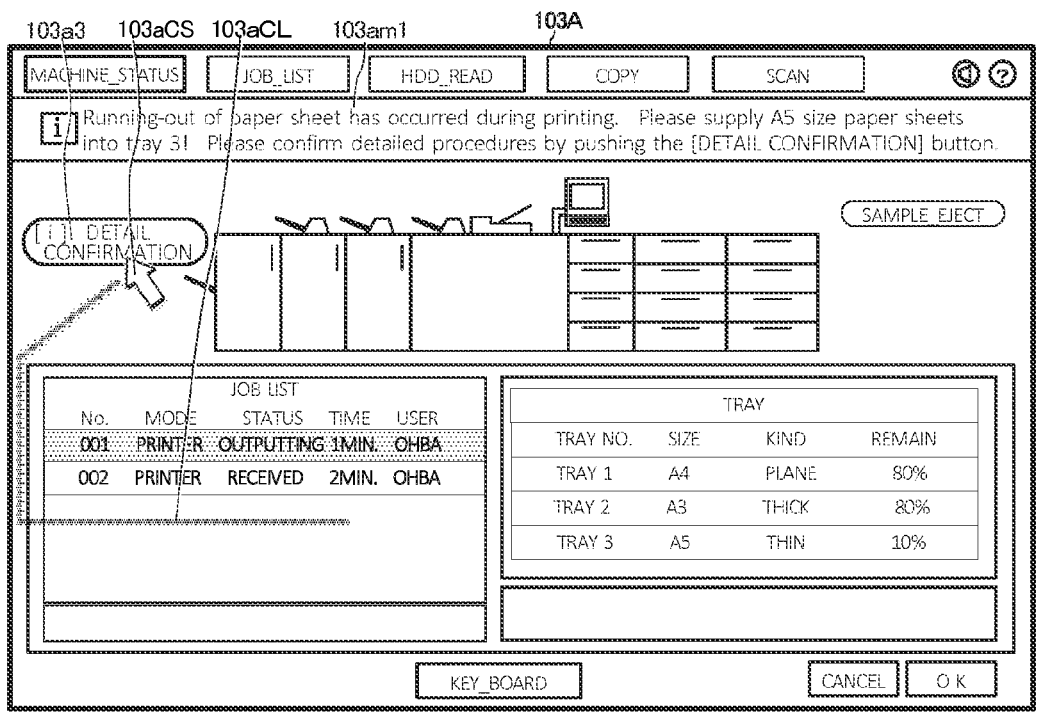
FIG. 19 is an explanatory schematic diagram showing yet another example of display screens to be displayed in an image forming system in accordance with an embodiment of the present invention.

In the exemplified schematic diagram shown in FIG. 19 corresponding to the display screen 103A shown in FIG. 7, the cursor residing at past position 103aCS', corresponding to the received job having NO. 002 in the job list, is made to move to current position 103aCS of the [DETAIL CONFIRMATION] button (button 103a3, shown in FIG. 19), while avoiding overlaps with the job list information, as shown in FIG. 19.

In this connection, hereinafter, with respect to the automatic cursor moving function to be controlled by the control section 101 when implementing the automatic cursor moving operation, a method for calculating the moving path will be detailed in the following. This method for calculating the moving path is constituted by processing steps 1 through 6 as indicated in the following.

Step 1; determining whether or not any one of various kinds of information, such as character information, graphics information, a bold frame line of a table, etc., exists on the shortest straight line connecting the moving start coordinate position with the moving destination coordinate position (at which the automatic cursor moving operation is to be finalized).

Step 2; when determining that any one of various kinds of information exists on the shortest straight line, making the cursor automatically move in a direction of the shortest straight line within a range including none of the various kinds of information, and determining whether or not any one of various kinds of information exists in the X-coordinate direction in the vicinity of the moving destination coordinate position and just before the any one of various kinds of information exists in the direction of the shortest straight line. When determining that none of the various kinds of information exists in the X-coordinate direction concerned, making the cursor automatically move in the X-coordinate direction concerned while avoiding the cursor automatically move to the shortest straight line.

Step 3; when determining that any one of various kinds of information exists on the shortest straight line, making the cursor automatically move in a direction of the shortest straight line within a range including none of the various kinds of information, and determining whether or not any one of various kinds of information exists in the X-coordinate direction in the vicinity of the moving destination coordinate position and just before the any one of various kinds of information exists in the direction of the shortest straight line. When determining that any one of the various kinds of information exists in the X-coordinate direction concerned, determining whether or not any one of various kinds of information exists in the Y-coordinate direction in the vicinity of the moving destination coordinate position. When determining that any one of the various kinds of information exists in the Y-coordinate direction concerned, making the cursor automatically move in the Y-coordinate direction concerned while avoiding the cursor automatically move to the X-coordinate direction concerned.

Step 4; repeating Steps 2 and Steps 3 above-mentioned, to calculate the moving path of the cursor from the moving start coordinate position to the moving destination coordinate position.

Step 5; when determining that any one of various kinds of information exists in the X-direction and/or the Y-direction, in Step 3 and Step 4 above-mentioned, further determining whether or not any information exists in an X-coordinate position being far from the moving destination coordinate position and/or a Y-coordinate position being far from the moving destination coordinate position. When determining that none of the various kinds of information exists in the X-coordinate direction and/or the Y-coordinate direction concerned, making the cursor automatically move in either X-coordinate direction or the Y-coordinate direction concerned. When determining that it is impossible to move the cursor in either X-coordinate direction or the Y-coordinate direction concerned, disabling the implementation of the operation for depicting the cursor image and the locus image according to the method above-mentioned.

Step 6; when determining that any one of various kinds of information exists at the moving destination coordinate position, shifting the moving destination coordinate position up to such a position, at which none of various kinds of information exists, within the area of the object concerned, and then, depicting the cursor and the locus thereat.

In this connection, the scope of the method for calculating the moving path to be employed by the control section 101 when implementing the automatic cursor moving operation is not limited to such a practice that the calculation is to be implemented every time when the automatic cursor moving operation becomes necessary. For instance, various kinds of moving path candidates to be employed in a case where none of various kinds of information exists, may be established in advance, so as to make it possible to sequentially employ a connectable moving path candidate, selected from the various kinds of moving path candidates residing in the vicinity of the concerned position, every time when the automatic cursor moving operation becomes necessary. In the above case, although the selected moving path is not necessary the shortest one, it becomes possible to shorten the calculation time above-mentioned, so as to surely implement the automatic cursor moving operation within a short time.

<Modified Example of Detailed Operations (2)>

In the aforementioned descriptions, it is desirable that the moving locus 103*a*CL, which indicates the movement of the cursor on the display screen, is displayed during a predetermined time interval as a notification for the user. The predetermined time interval, above-mentioned, may be established as either a concrete value of the time interval, for instance, 30 seconds, or a variable time interval until the user clicks the object pointed by the cursor residing at current position 103*a*CS serving as the destination point thereof.

Further, in a case where the locus 103*a*CL is established as a non-display image, although it is applicable that all of the locus 103*a*CL is made to disappear at a time, it may be further desirable as a notification for the user that the locus 103*a*CL is made to gradually disappear from the moving start coordinate position to the moving destination coordinate position. Further, in a case where the user has not click the object even after the predetermined constant time interval has elapsed, a part of the locus 103*a*CL in the vicinity of the cursor residing at current position 103*a*CS may be still displayed even though almost of all the locus 103*a*CL is made to disappear. This measure may be also desirable as a notification for the user.

<Modified Example of Detailed Operations (3)>

In the aforementioned descriptions, even though a certain status change has occurred, the automatic cursor moving function, provided in the control section 101, does not conduct any corresponding operation for moving the cursor, during the time when the user operates the pointing device 103*p* or another device, such as key inputting device 103*k*, etc. Then, only in a case where the user performs no operation even after a predetermined constant time has elapsed since the user had completed the operation and the control section 101 has completed the processing corresponding to the user's operation concerned, the control section 101 activates the automatic cursor moving function. According to the above-mentioned, by giving a priority to the operation performed by the user, it becomes possible to issue an appropriate notification in regard to the status change based on the operation status, and it also becomes possible to appropriately conduct the operation for implementing the processing by employing the pointing device 103*p* for moving the cursor within the display screen of the GUI (Graphical User Interface).

<Modified Example of Detailed Operations (4)>

In the aforementioned descriptions, in a case where the display screen, currently displayed on the operating display section 103, is the "display screen corresponding to the apparatus status" (Step S103, shown in FIG. 3), it is possible to delay the commencement of the automatic cursor moving operation. For instance, in a case where the display screen is changed from the other display screen (Step S108, shown in FIG. 3), or in another case where the display screen 103A is displayed by turning ON the electric power source or the like, it is desirable that the automatic cursor moving function is activated after the predetermined constant time interval has elapsed since the control section 101 has completed the controlling operations by activating the display controlling function, for indicating an object, which corresponds to a processing necessary for coping with the status change concerned, or a processing implementation position display that indicates such a position at which a processing necessary for coping with the status change concerned should be implemented, on the screen.

For instance, in such a case that the automatic cursor moving function is activated at the time immediately after the display screen 103A has changed, sometimes, the user hardly recognizes the implementation of the automatic cursor moving operation. To overcome the above-mentioned drawback, after a predetermined constant time has elapsed since a necessary image has been displayed onto the display screen 103A, the cursor is made to move corresponding to the status change concerned. Accordingly, since the object or the display position, residing at the destination position to which the cursor is made to automatically move, is displayed, preceding to the activation of the automatic cursor moving operation, it becomes possible to issue an appropriate notification in regard to the status change, and it also becomes possible to appropriately conduct the operation for implementing the processing by employing the pointing device for moving the cursor within the display screen of the GUI (Graphical User Interface).

According to the preferred embodiment described in the foregoing, it becomes possible to attain the advantageous effects described as follows.

(1) The processing apparatus, in accordance with the embodiment of the present invention, is provided with: the display controlling function for displaying the cursor and the object corresponding to contents of processing, on the screen; a processing implementation controlling function for implementing the processing corresponding to the object designated by the cursor; a status change detecting function for detecting a status change of the apparatus; and an automatic cursor moving function for automatically moving the cursor to the object corresponding to the processing operation being necessary for the status change concerned. According to the above-mentioned, it becomes possible to clarify the next necessary operation to be conducted by the user's side, caused by the status change of the apparatus concerned. As a result, it becomes possible to appropriately conduct the operation for implementing the processing by employing the pointing device for moving the cursor within the display screen of the GUI.

(2) In the processing apparatus recited in above-item 1, the status change detecting function detects such the status change that is caused by an error to which a restoration processing is necessary to apply. Further, when the status change detecting function detects the error as the status change, the automatic cursor moving function makes the cursor automatically moves onto the object, which corresponds to the restoration processing, or onto a processing implementation position display that indicates such a position at which a processing necessary for coping with the error concerned should be implemented, on the screen.

According to the above-mentioned, when the status change of the apparatus is caused by an error, it becomes possible to clarify the next necessary operation (restoration processing for the error) to be conducted by the user's side, caused by the error concerned. As a result, it becomes possible to appropriately conduct the operation for implementing the processing by employing the pointing device for moving the cursor within the display screen of the GUI.

(3) In the processing apparatus recited in above-item 1, the status change detecting function detects a fact that a job, which is to be implemented by the processing implementation controlling function, is received, as the status change. Further, in the screen for designating the processing to be implemented by the processing implementation controlling function, the automatic cursor moving function makes the cursor automatically move onto the object corresponding to a commencement of the job detected by the status change detecting function as the status change. According to the above-mentioned, when the status change of the apparatus is caused by receiving a job, it becomes possible to clarify the next necessary operation (operation for commencing the job concerned) to be conducted by the user's side, caused by the error concerned. As a result, it becomes possible to appropriately conduct the operation for implementing the processing by employing the pointing device for moving the cursor within the display screen of the GUI.

(4) In the processing apparatus recited in above-item 2, the automatic cursor moving function makes the cursor automatically move onto the object corresponding to a guidance display of error cancelling procedures, serving as the object corresponding to the restoration processing. According to the above-mentioned, when the status change of the apparatus is caused by an error, it becomes possible to clarify the next necessary operation (operation for displaying the guidance display of error cancelling procedures) to be conducted by the user's side, caused by the error concerned. As a result, it becomes possible to appropriately conduct the operation for implementing the processing by employing the pointing device for moving the cursor within the display screen of the GUI.

(5) In the processing apparatus recited in above-item 2, the automatic cursor moving function makes the cursor automatically move onto the object corresponding to a resumption of the processing after the error has been cancelled, serving as the object corresponding to the restoration processing. According to the above-mentioned, when the status change of the apparatus is caused by an error, it becomes possible to clarify the next necessary operation (operation of the object corresponding to a resumption of the processing after the error has been cancelled) to be conducted by the user's side, caused by the error concerned. As a result, it becomes possible to appropriately conduct the operation for implementing the processing by employing the pointing device for moving the cursor within the display screen of the GUI.

(6) In the processing apparatus recited in above-item 2, the automatic cursor moving function makes the cursor automatically move onto the object corresponding to a material existence detecting adjustment to be implemented after an operation for supplying materials has been completed, serving as the object corresponding to the restoration processing. According to the above-mentioned, when the status change of the apparatus is caused by an error, it becomes possible to clarify the next necessary operation (operation for implementing the material existence detecting adjustment after the operation for supplying materials has been completed) to be conducted by the user's side, caused by the error concerned. As a result, it becomes possible to appropriately conduct the operation for implementing the processing by employing the pointing device for moving the cursor within the display screen of the GUI.

(7) In the processing apparatus recited in above-item 2, the automatic cursor moving function makes the cursor automatically move onto a specific position on the screen, which corresponds to an error occurring position within an image forming apparatus, as the processing implementation position display at which the necessary processing operation should be implemented against the error. According to the above-mentioned, when the status change of the apparatus is caused by an error, it becomes possible to clarify the meaning of the status change (occurrence of the error) and the position at which the concerned error has occurred. As a result, it becomes possible to appropriately conduct the operation for implementing the processing by employing the pointing device for moving the cursor within the display screen of the GUI.

(8) In the processing apparatus recited in any one of above-items 1-7, the control section is further provided with a user management function that manages a usable range of the processing apparatus allotted to a user, based on an authority established for every user. Under the management operations conducted by the user management function, in a case where the processing operation, being necessary for the status change concerned, falls into the usable range based on the authority established for the user, the automatic cursor moving function conducts the controlling operations so as to make the cursor move, while, in a case where the processing operation, being necessary for the status change concerned, is out of the usable range based on the authority established for the user, the automatic cursor moving function disables the controlling operations for making the cursor move. According to the above-mentioned, when the status change of the apparatus is caused by an error, it becomes possible to clarify the meaning of the status change (occurrence of the error) and the position at which the concerned error has occurred. As a result, it becomes possible to appropriately conduct the operation for implementing the processing by employing the pointing device for moving the cursor within the display screen of the GUI. According to the above-mentioned, since the cursor is controlled in accordance with the authority owned by the user concerned, it becomes possible to appropriately issue the status change notification based on the user's authority. As a result, it becomes possible to appropriately conduct the operation for implementing the processing by employing the pointing device for moving the cursor within the display screen of the GUI.

(9) In the processing apparatus recited in any one of above-items 1-8, during the time when the user is operating the pointing device or is performing another operation, the automatic cursor moving function disables the controlling operations for making the cursor move. According to the above-mentioned, since the priority is given to the user's operation, it becomes possible to appropriately issue the status change notification based on the operating status of the user concerned. As a result, it becomes possible to appropriately conduct the operation for implementing the processing by employing the pointing device for moving the cursor within the display screen of the GUI.

(10) In the processing apparatus recited in any one of above-items 1-9, after the display controlling function has completed the controlling operations for displaying the object corresponding to the processing operation being necessary for the status change concerned, or the processing implementation position display, at which the necessary processing operation should be implemented against the status change concerned, the automatic cursor moving function makes the cursor move in response to the status change. According to the above-mentioned, since the object and/or the processing implementation position display, each serving as the destination point onto which the cursor is made to automatically move, are displayed prior to the implementation of the cursor moving operation, it becomes possible to appropriately issue the status change notification. Accordingly, it becomes possible to appropriately conduct the operation for implementing the processing by employing the pointing device for moving the cursor within the display screen of the GUI.

(11) In the processing apparatus recited in any one of above-items 1-10, the automatic cursor moving function displays a cursor moving path, on which the cursor has been made to automatically move, during a predetermined time interval as a moving locus thereof. According to the above-mentioned, since the cursor moving operation is clearly indicated by the moving locus thereof, it becomes possible to appropriately issue the status change notification. Accordingly, it becomes possible to appropriately conduct the operation for implementing the processing by employing the pointing device for moving the cursor within the display screen of the GUI.

(12) In the processing apparatus recited in any one of above-items 1-11, the automatic cursor moving function makes the cursor move onto such a position, residing in the vicinity of a moving destination point, that does not conceal any information in regard to the moving destination point concerned. According to the above-mentioned, even after the cursor has been made to automatically move onto the destination point, it becomes possible to keep the information, attached to the destination point, clear. As a result, it becomes possible to appropriately conduct the operation for implementing the processing by employing the pointing device for moving the cursor within the display screen of the GUI.

(13) In the processing apparatus recited in any one of above-items 1-12, the automatic cursor moving function makes the cursor move in such a manner that the cursor does not overlap with an object, other than the object serving as a moving destination object, or a processing implementation position display, other than the processing implementation position display serving as a moving destination position, in midcourse of a moving operation thereof. According to the above-mentioned, even in midcourse of automatically moving the cursor, it becomes possible to keep the other information, residing along the moving path of the cursor, clear. Accordingly, it becomes possible to appropriately conduct the operation for implementing the processing by employing the pointing device for moving the cursor within the display screen of the GUI.

(14) In the processing apparatus recited in any one of above-items 1-13, the automatic cursor moving function makes the cursor flash between ON and OFF states at the cursor moving destination position. According to the above-mentioned, since the flashing of the cursor makes it clear that the concerned cursor has automatically moved, it becomes possible to appropriately issue the status change notification. As a result, it becomes possible to appropriately conduct the operation for implementing the processing by employing the pointing device for moving the cursor within the display screen of the GUI.

(15) In the processing apparatus recited in any one of above-items 1-14, under the controlling operations conducted by the control section, the processing section implements the various kinds of processing in regard to the image processing and/or the image forming operations. According to the above-mentioned, in the image processing apparatus and/or the image forming apparatus, it becomes possible to appropriately issue the status change notification in regard to the apparatus concerned. As a result, it becomes possible to appropriately conduct the operation for implementing the processing by employing the pointing device for moving the cursor within the display screen of the GUI.

While the preferred embodiments of the present invention have been described using specific term, such description is for illustrative purpose only, and it is to be understood that changes and variations may be made without departing from the spirit and scope of the appended claims.

What is claimed is:

1. A processing apparatus, comprising:
   a control section that conducts controlling operations for displaying an image on a screen and for controlling each of sections; and
   a processing section that implements various kinds of processing, under the controlling operations conducted by the control section;
   wherein the control section is provided with:
      a display controlling function that controls displaying operations to be implemented on the screen, so as to display an object, which corresponds to contents of a processing, on the screen, and so as to display a cursor, which corresponds to an operation of a pointing device;
      a processing implementation controlling function that implements the processing, which corresponds to the object designated by the cursor;
      a status change detecting function that detects a status change against which it is necessary for the processing apparatus to implement a processing;
      an automatic cursor moving function that, when the status change detecting function detects the status change, conducts the controlling operations so as to automatically move the cursor onto the object, which corresponds to the processing necessary for coping with the status change concerned, or onto a processing implementation position display that indicates such a position at which the processing necessary for coping with the status change concerned should be implemented, on the screen; and
      a user management function that manages a usable range of the processing apparatus allotted to a user, based on an authority established for every user, the usable range being a range of processing operations that the user has authority to perform; and
   wherein, under management operations conducted by the user management function, when the processing operation that is necessary for the status change concerned falls into the usable range based on the authority established for the user, the automatic cursor moving function conducts the controlling operations so as to make the cursor move, and when the processing operation that is necessary for the status change concerned is out of the usable range based on the authority established for the user, the automatic cursor moving function disables the controlling operations for making the cursor move, and
   wherein the automatic cursor moving function conducts the controlling operations so as to display a cursor moving path, on which the cursor has been made to move, during a predetermined time interval as a moving locus thereof.

2. The processing apparatus of claim 1,
wherein the status change detecting function detects such the status change that is caused by an error to which a restoration processing is necessary to apply; and
wherein, when the status change detecting function detects the error as the status change, the automatic cursor moving function conducts the controlling operations, so as to automatically move the cursor to the object corresponding to the restoration processing, or the processing implementation position display, at which the necessary processing operation should be implemented against the error.

3. The processing apparatus of claim 2,
wherein the automatic cursor moving function conducts the controlling operations so as to automatically move the cursor onto the object corresponding to a guidance display of error cancelling procedures, serving as the object corresponding to the restoration processing.

4. The processing apparatus of claim 2,
wherein the automatic cursor moving function conducts the controlling operations so as to automatically move the cursor onto the object corresponding to a resumption of the processing after the error has been cancelled, serving as the object corresponding to the restoration processing.

5. The processing apparatus of claim 2,
wherein the automatic cursor moving function conducts the controlling operations so as to automatically move the cursor onto the object corresponding to a material existence detecting adjustment to be implemented after an operation for supplying materials has been completed, serving as the object corresponding to the restoration processing.

6. The processing apparatus of claim 2,
wherein the automatic cursor moving function conducts the controlling operations so as to automatically move the cursor onto a specific position on the screen, which corresponds to an error occurring position within an image forming apparatus, as the processing implementation position display at which the necessary processing operation should be implemented against the error.

7. The processing apparatus of claim 1,
wherein the status change detecting function detects a fact that a job, which is to be implemented by the processing implementation controlling function, is received, as the status change; and
wherein, in the screen or designating the processing to be implemented by the processing implementation controlling function, the automatic cursor moving function conducts the controlling operations, so as to automatically move the cursor onto the object corresponding to a commencement of the job detected by the status change detecting function as the status change.

8. The processing apparatus of claim 1,
wherein, during a time when the user is operating the pointing device or is performing another operation, the automatic cursor moving function disables the controlling operations for making the cursor move.

9. The processing apparatus of claim 1,
wherein, after the display controlling function has completed the controlling operations for displaying the object corresponding to the processing operation being necessary for the status change concerned, or the processing implementation position display, at which the necessary processing operation should be implemented against the status change concerned, the automatic cursor moving function conducts the controlling operations so as to make the cursor move in response to the status change.

10. The processing apparatus of claim 1,
wherein the automatic cursor moving function conducts the controlling operations so as to make the cursor move onto such a position, residing in the vicinity of a moving destination point, that does not conceal any information in regard to the moving destination point concerned.

11. The processing apparatus of claim 1,
wherein the automatic cursor moving function conducts the controlling operations so as to make the cursor flash between ON and OFF states at a cursor moving destination position.

12. The processing apparatus of claim 1,
wherein, under the controlling operations conducted by the control section, the processing section implements the various kinds of processing in regard to an image processing and/or an image forming operations.

13. A method for controlling a processing apparatus, including a control section that conducts controlling operations for displaying an image on a screen and for controlling each of sections and a processing section that implements various kinds of processing, based on the controlling operations conducted by the control section, the method comprising:
controlling displaying operations to be implemented on the screen, so as to display an object, corresponding to contents of processing, on the screen, and so as to display a cursor corresponding to an operation of a pointing device;
implementing the processing corresponding to the object designated by the cursor;
detecting a status change against which it is necessary for the processing apparatus to implement a processing;
automatically moving the cursor to the object, which corresponds to the processing necessary for coping with the status change concerned, or onto a processing implementation position display that indicates such a position at which the processing necessary for coping with the status change concerned should be implemented, on the screen; and
managing a usable range of the processing apparatus allotted to a user, based on an authority established for every user, the usable range being a range of processing operations that the user has authority to perform;
wherein, under management operations conducted in the managing step, when the processing operation that is necessary for the status change concerned falls into the usable range based on the authority established for the user, the controlling operations for performing the automatic moving of the cursor are performed, and when the processing operation that is necessary for the status change concerned is out of the usable range based on the authority established for the user, the controlling operations for performing the automatic moving of the cursor are disabled, and
wherein, in the moving step, a cursor moving path, on which the cursor has been made to move, is displayed during a predetermined time interval as a moving locus thereof.

14. The method of claim 13,
wherein such the status change that is caused by an error to which a restoration processing is necessary to apply, is detected in the detecting step; and wherein, when the error is detected as the status change in the detecting step, the cursor is made to automatically move to the object corresponding to the restoration processing, or the processing implementation position display, at which the necessary processing operation should be implemented against the error, in the moving step.

15. The method of claim 14,
wherein, in the moving step, the cursor is made to automatically move onto the object corresponding to a guidance display of error cancelling procedures, serving as the object corresponding to the restoration processing.

16. The method of claim 14,
wherein, in the moving step, the cursor is made to automatically move onto the object corresponding to a resumption of the processing after the error has been cancelled, serving as the object corresponding to the restoration processing.

17. The method of claim 14,
wherein, in the moving step, the cursor is made to automatically move onto the object corresponding to a material existence detecting adjustment to be implemented after an operation for supplying materials has been completed, serving as the object corresponding to the restoration processing.

18. The method of claim 14,
wherein, in the moving step, the cursor is made to automatically move onto a specific position on the screen, which corresponds to an error occurring position within an image forming apparatus, as the processing implementation position display at which the necessary processing operation should be implemented against the error.

19. The method of claim 13,
wherein a fact that a job, which is to be implemented in the implementing step, is received, is detected as the status change in the detecting step; and
wherein, in the screen for designating the processing to be implemented in the implementing step, the cursor is made to automatically move onto the object corresponding to a commencement of the job detected in the detecting step as the status change, in the moving step.

* * * * *